July 10, 1956  C. M. O'LEARY  2,753,738
POWER TRANSMITTING APPARATUS
Original Filed Feb. 15, 1946  6 Sheets-Sheet 1
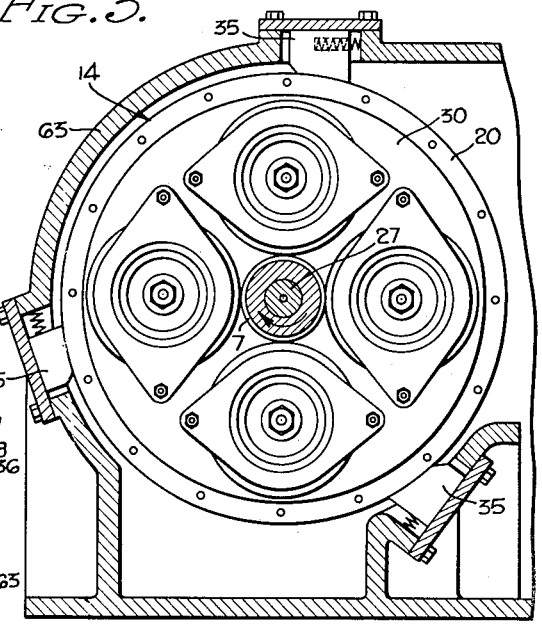
Fig. 3.
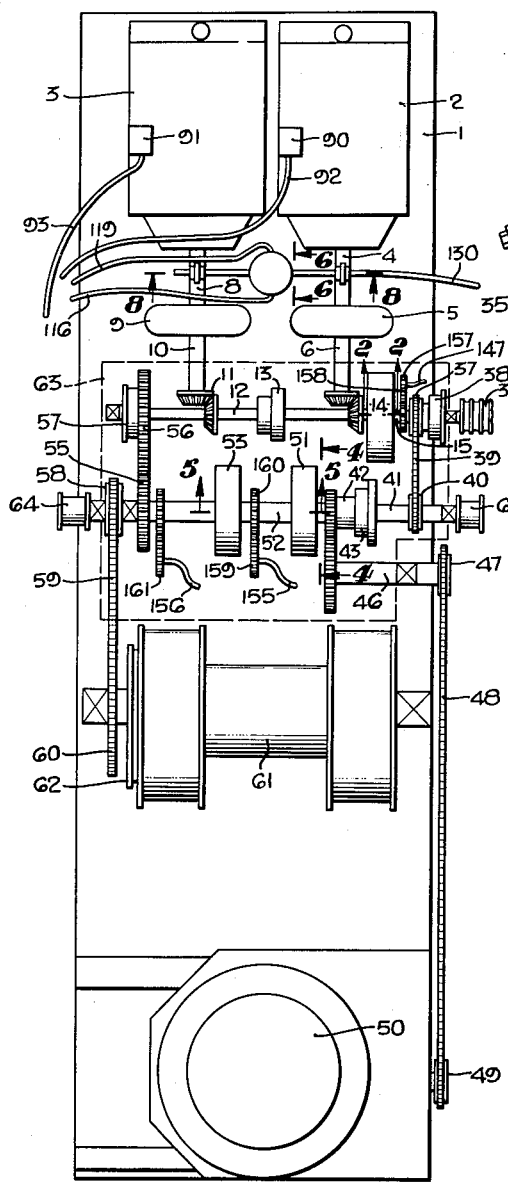
Fig. 1.
Fig. 2.
INVENTOR.
CHARLES M. O'LEARY
BY
ATTORNEY July 10, 1956 C. M. O'LEARY 2,753,738
POWER TRANSMITTING APPARATUS
Original Filed Feb. 15, 1946 6 Sheets-Sheet 3
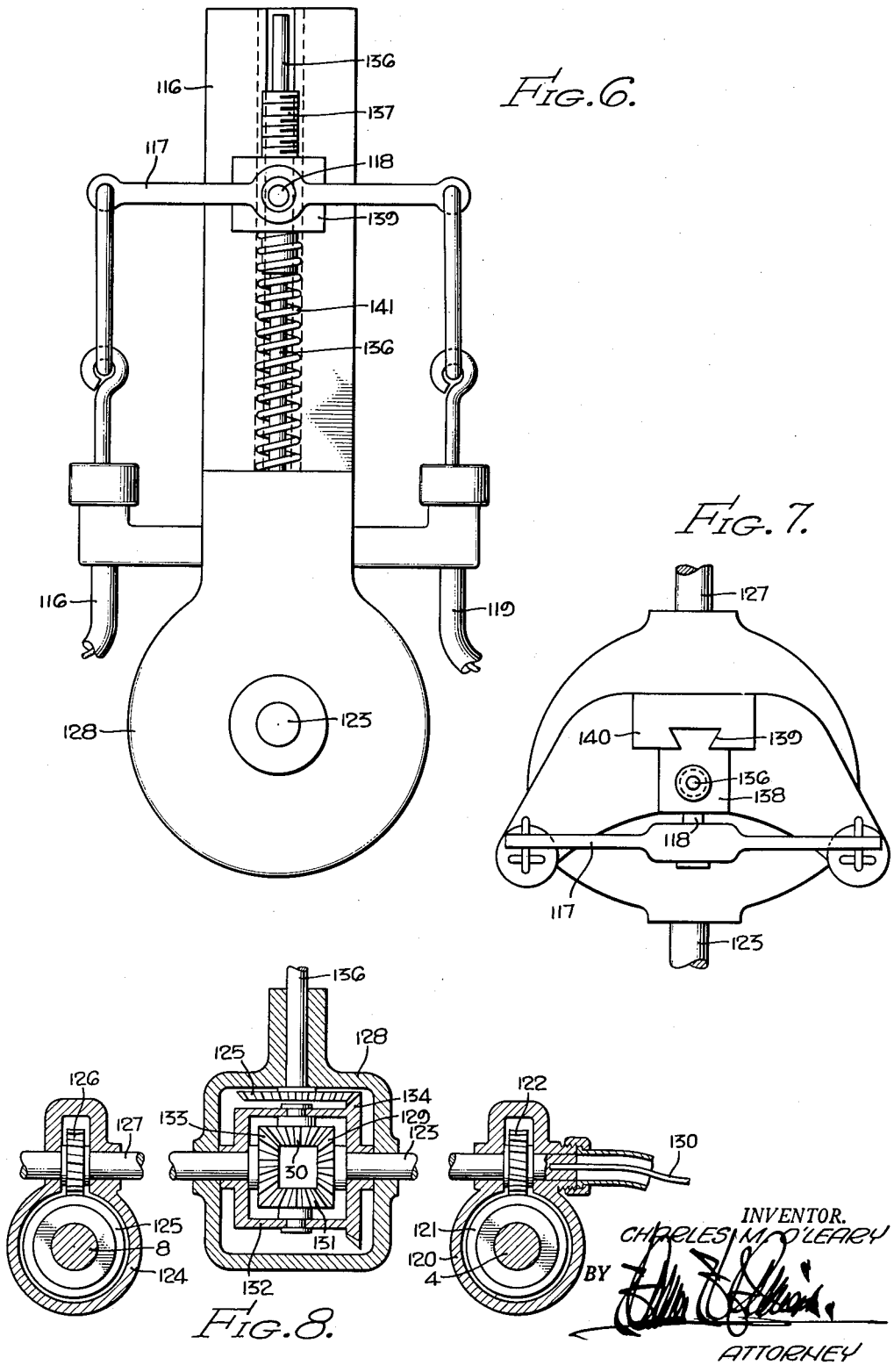

July 10, 1956 C. M. O'LEARY 2,753,738
POWER TRANSMITTING APPARATUS
Original Filed Feb. 15, 1946 6 Sheets-Sheet 4
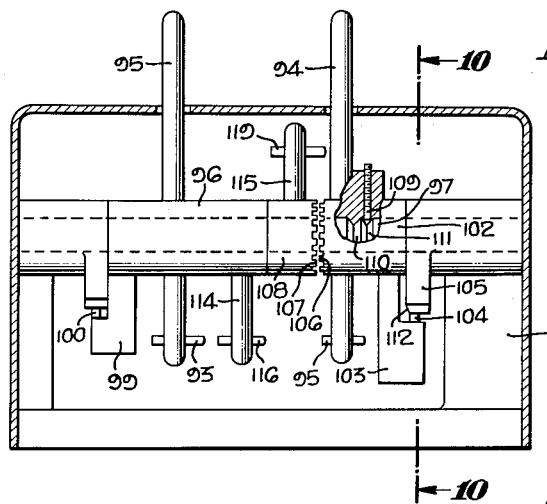
Fig. 9.
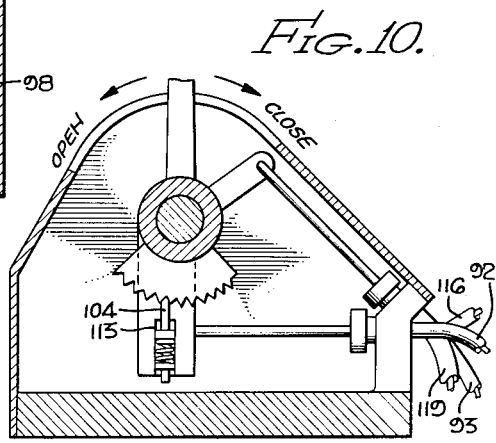
Fig. 10.
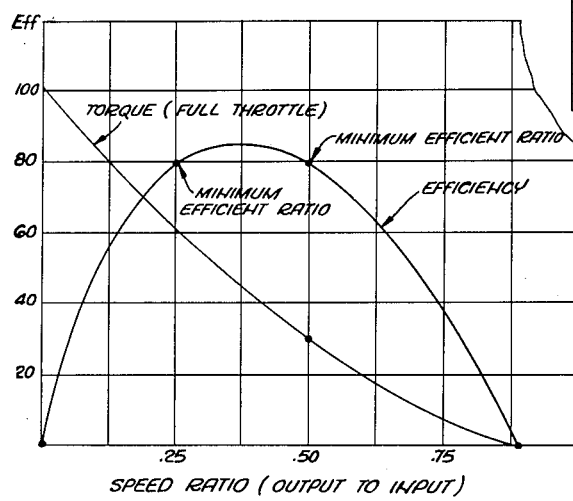
Fig. 21.
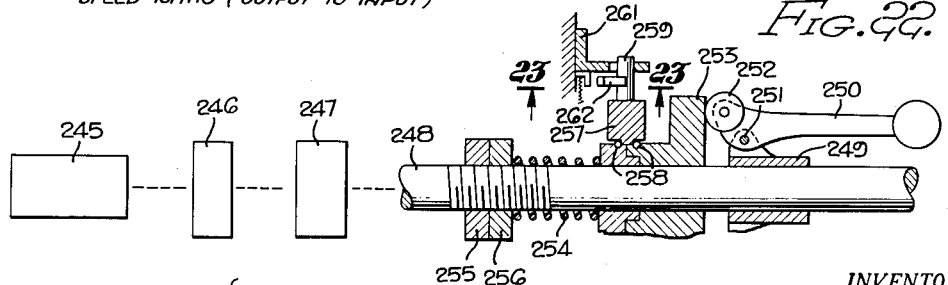
Fig. 22.
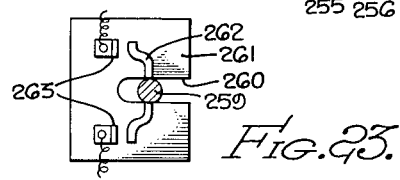
Fig. 23.
INVENTOR.
CHARLES M. O'LEARY
BY
ATTORNEY July 10, 1956  C. M. O'LEARY  2,753,738
POWER TRANSMITTING APPARATUS
Original Filed Feb. 15, 1946  6 Sheets-Sheet 5
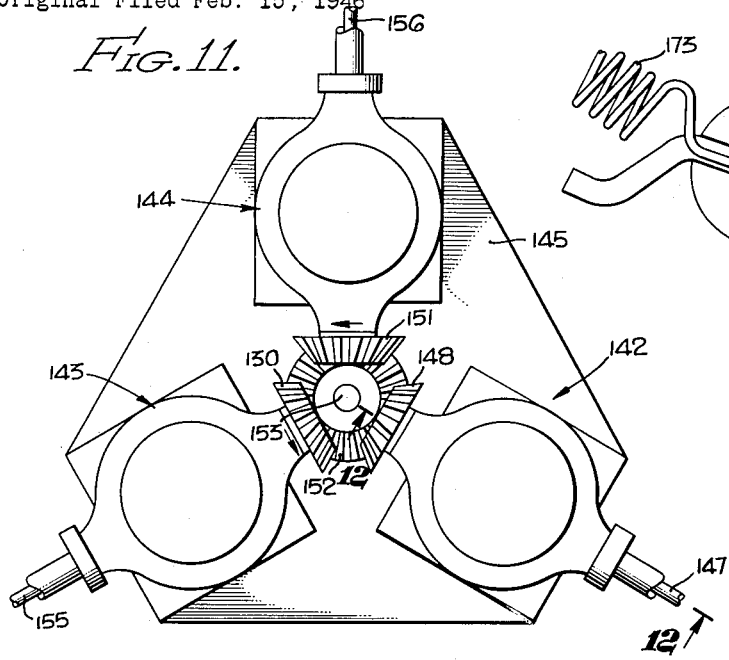
FIG. 11.
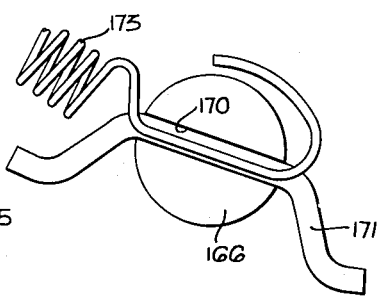
FIG. 14.
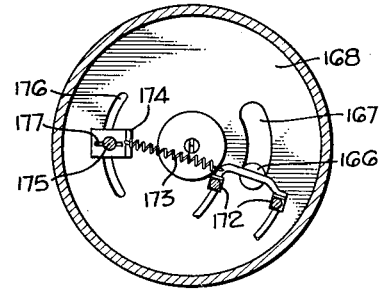
FIG. 13.
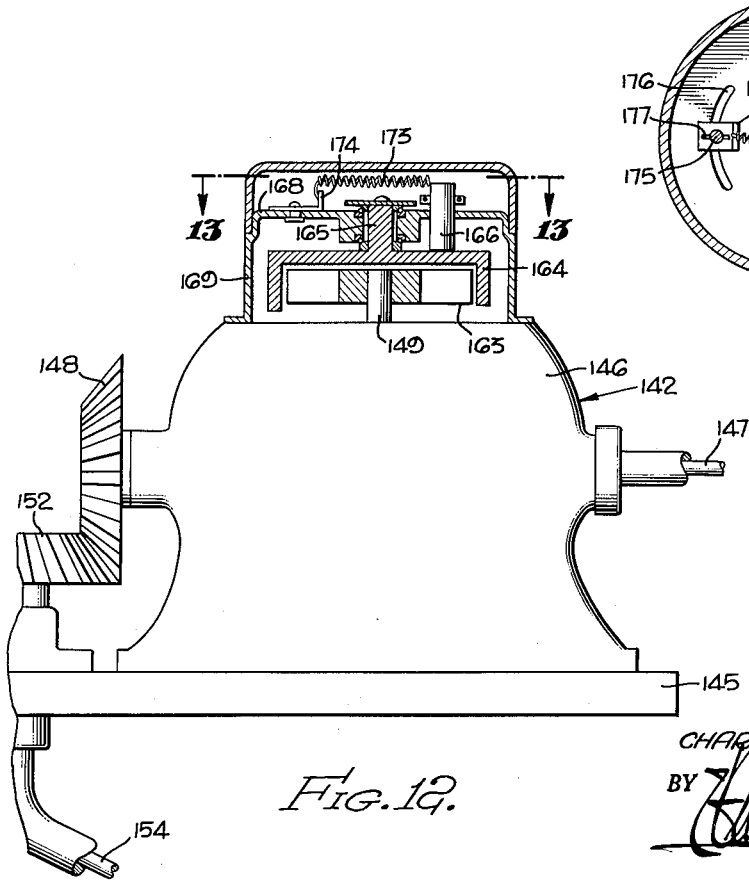
FIG. 12.
INVENTOR.
CHARLES M. O'LEARY
BY
ATTORNEY

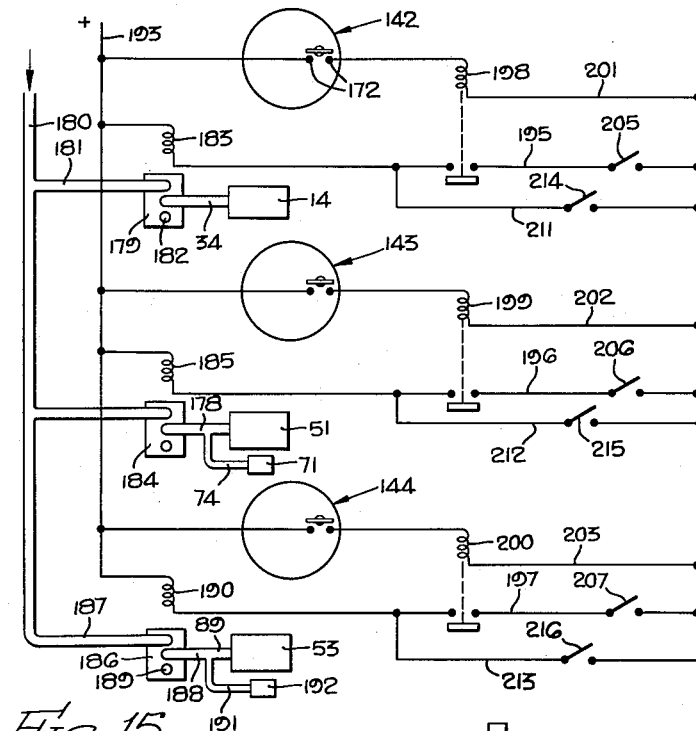

United States Patent Office 2,753,738
Patented July 10, 1956

2,753,738

POWER TRANSMITTING APPARATUS

Charles M. O'Leary, Los Angeles, Calif.

Original application February 15, 1946, Serial No. 647,677, now Patent No. 2,589,119, dated March 11, 1952. Divided and this application November 2, 1951, Serial No. 254,506

39 Claims. (Cl. 74—731)

This application is a division of my application Serial No. 647,677, filed February 15, 1946, issued March 11, 1952 as Patent No. 2,589,119.

The present invention relates to an automatic multiple speed transmission mechanism and to a rotary well drilling machine employing a special form of said transmission.

It is one object of the present invention to provide an improved automatic multiple speed transmission.

Another object is to provide, in combination with a hydrokinetic torque converter, an automatic multiple speed ratio transmission which will maintain the speed ratio of the converter within a predetermined efficient range regardless of variations in the load.

Another object of the invention is to provide a combination of the type mentioned in which the transmission will also maintain the speed ratio of the converter within predetermined limits regardless of variations in the input speed of the converter.

Another object of the invention is to provide a mechanism for actuating a control instrumentality in response to the existence of a predetermined ratio between the speeds of two shafts.

Another object of the invention is to provide means by which the transmission may be selectively subject to automatic or manual control.

Another object of the invention is to provide an improved multiple speed transmission having a plurality of power take-offs and means to drive each take-off in either direction at several speed ratios.

Another object of the invention is to provide a transmission of the type last mentioned in combination with two independent power sources, which transmission is adapted selectively to drive one or more power take-offs from either one or both power sources or to drive two take-offs simultaneously at several speed ratios from separate power sources respectively.

A further object is to provide an improved control mechanism for synchronizing a plurality of internal combustion engines.

Another object of the invention is to provide an improved rotary well drilling machine characterized by its compactness, high efficiency, flexibility and ease of operation.

Other objects and advantages of the invention will become apparent from the following specification, the accompanying drawings and the appended claims.

Referring to the drawings in which like numerals are applied to like parts in the several views:

Figure 1 is a diagrammatic plan view of a well drilling machine incorporating all of the features of the present invention;

Figure 2 is a longitudinal section taken on the line 2—2 of Figure 1 showing the actual construction of one of the planetary transmission units indicated diagrammatically in Figure 1;

Figure 3 is a transverse section taken on the line 3—3 of Figure 2;

Figure 6 is a fragmentary section taken on the line 6—6 of Figure 1 showing the engine synchronizing mechanism in the engine throttle control linkage Figure 7 is a plan view of the mechanism shown in Figure 6;

Figure 8 is a transverse section taken on the line 8—8 of Figure 1;

Figure 9 is an elevation view of the throttle control lever mechanism with the surrounding casing in section;

Figure 10 is a transverse section taken on the line 10—10 of Figure 9;

Figure 11 is a plan view of the differentially operated switches employed to control the speed ratios in the transmission mechanism of Figure 1;

Figure 12 is a view of one of the differentially operated switches taken partly in section on the line 12—12 of Figure 11;

Figure 13 is a horizontal section taken on the line 13—13 of Figure 12;

Figure 14 is an enlarged view of a portion of the mechanism shown in Figure 11;

Figure 15 is a diagrammatic view of the combined electrical control circuit for the transmission;

Figure 16 is a longitudinal, sectional view taken through the control mechanism for the manually operated switches in the circuit of Figure 15;

Figure 17 is a transverse section taken on the line 17—17 of Figure 16;

Figure 18 is a transverse section taken on the line 18—18 of Figure 16;

Figure 19 is a transverse section taken on the line 19—19 of Figure 16;

Figure 20 is a transverse section taken on the line 20—20 of Figure 16;

Figure 21 shows the representative torque and efficiency curve of the torque converters employed in the mechanism of Figure 1;

Figure 22 is a diagrammatic view of a modified form of the invention with a fragmentary, longitudinal section through a simplified form of transmission shifting control switch;

Figure 23 is a view taken on the line 23—23 of Figure 20; and

Figure 24 is a fragmentary view partly diagrammatic of a modified form of transmission unit.

Figure 4:
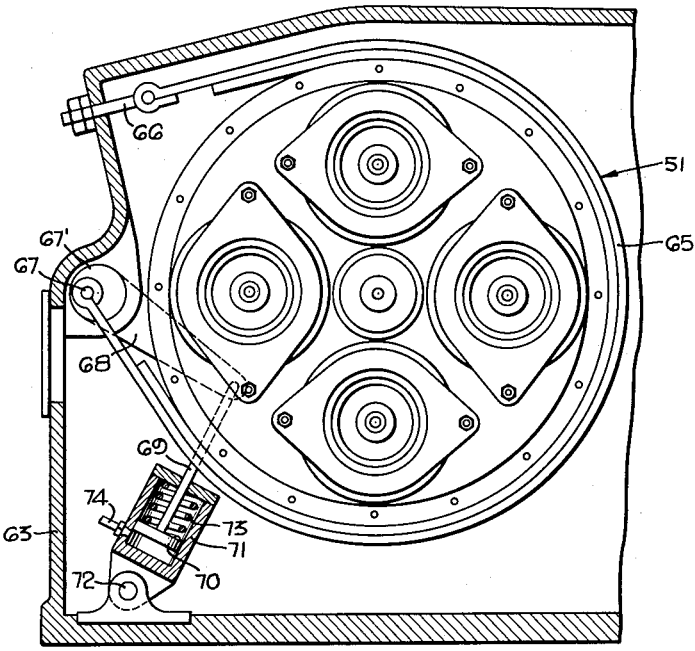
Figure 4 is a transverse section taken on the line 4—4 of Figure 1.

In general, the complete machine of the present invention embodies, as a single unit, a plurality of engines connected by hydrokinetic torque converters to an improved form of multiple speed transmission which incorporates power take-offs for driving the hoisting drum, the rotary table and the slush pumps of a rotary well drilling machine. Thus, as shown in Figure 1, the mechanism includes a base 1 having mounted thereon a pair of internal combustion engines 2 and 3. The shaft of engine 2 is connected in any suitable manner to the input shaft 4 of a hydrokinetic torque converter 5 having an output shaft 6 connected by bevel gearing to a shaft 7 of the transmission mechanism. The shaft of engine 3 is similarly connected to the input shaft 8 of a hydrokinetic torque converter 9 whose output shaft 10 is connected by bevel gearing 11 to a transmission shaft 12 that is coaxial with the previously mentioned shaft 7 and which may be connected to shaft 7 at the will of the operator in any desired manner as by a pneumatically operated clutch, indicated diagrammatically at 13.

The opposite end of shaft 7 constitutes the input shaft of a two speed transmission 14 having an output shaft 15 which is coaxial with the shaft 7. As best shown in Figure 2, the transmission 14 is of a planetary type and is carried by the adjoining ends of the shafts 7 and 15. Thus, the right-hand end of shaft 7, as viewed in Figures 1 and 2, is journaled in a bearing 16 carried by a web or pedestal 17 formed within the casing of the transmission, while the left-hand end of shaft 15 is similarly journaled in a bearing 18 carried by a web or pedestal 19. A planetary cage 20 is journaled by means of bearings 21 and 22 on the ends of the shafts 7 and 15 respectively. A plurality of gear clusters 23 which are fixed on shafts 24, respectively, are journaled in the cage 20. Each of the gear clusters comprises a pair of gears which mesh respectively with gears 25 and 26 carried respectively by the ends of the shafts 7 and 15. It will be noted that gear 25 is smaller than the planet gears with which it engages, while the other planet gears of each cluster are smaller than the gear 26. Consequently, when the planet cage 20 is held stationary, the shaft 15 will rotate at a lower speed than shaft 7, but in the same direction. The ends of the shafts 7 and 15 are provided with axial bores which receive a pilot shaft 27 which assists in holding the ends of the shafts in proper alignment; and the pilot shaft 27 is provided with a central bore which may be used to supply lubricant to the mechanism.

The ends of the shafts 24 of the planetary gear clusters are extended and each is provided with a cone clutch element 28 adapted to co-operate with a mating cone clutch 29 carried by a clutch plate 30. The plate 30 is slidably mounted on the shaft 7 and adapted to be forced to the right, as viewed in Figure 2, to cause engagement of the clutches. This function is performed by means of an annular movable cylinder 31 which co-operates with an annular piston 32 fixed to the bearing pedestal 17. The piston 32 is provided with a passageway 33 which communicates with a pipe 34 through which air under pressure may be supplied in the manner hereinafter described to actuate the annular cylinder 31 and thereby cause engagement of the planet gear clutches. If desired, suitable springs, not shown, may be employed between clutch plate 30 and cage 20 in the regions intermediate clutches 28 to effect disengagement of the clutches when the air pressure is relieved.

When the clutches 28 are held against rotation about their own axes by the clutch elements 29, the shafts 7 and 15 are locked together in a 1 to 1 ratio. When the clutch elements are disengaged, the planetary gearing tends to rotate shaft 15 in the same direction as shaft 7 and at the same time tends to effect a reverse rotation of the planet cage 20. In order to prevent such reverse rotation of the planet cage, a plurality of equally spaced one way brake blocks 35 are mounted in suitable recesses formed in the casing of the transmission, as best shown in Figure 3. These brake blocks are so constructed and arranged that they operate to prevent counterclockwise rotation of the planet cage 20, as viewed in Figure 3. Accordingly, when the clutches 28 are disengaged, the planetary cage 20 will be held stationary by the brake blocks 35 and shaft 15 will be driven by shaft 7 in the same direction as the latter but at a reduced speed. This form of two speed transmission is peculiarly suited for use in heavy hoisting operations for the reason that shifts in the speed ratio may be effected at any time under load without danger of dropping the load. If for any reason the air supply for shifting the transmission fails, the transmission will remain in its low speed ratio by reason of the one way brake blocks 35.

The output shaft 15 of transmission 14 carries a multiple rope or V-belt pulley 36 which is employed as the power take-off to operate the slush pumps, not shown. A clutch of any desired construction should be provided between the shaft 15 and the slush pumps at any point in the drive connection in order to disengage the slush pumps when the drilling operation is interrupted.

A sprocket 37 is normally freely rotatable upon the shaft 15 but may be clutched to the shaft 15 at any time by means of an air operated clutch, indicated diagrammatically at 38. The sprocket 37 is connected by a chain 39 to a similar sprocket 40 fixed on a shaft 41 which is parallel to the shafts 7, 12 and 15 and mounted within the same casing. Shaft 41 has freely rotatable thereon a sleeve 42 which may be clutched to the shaft 41 at any time by means of an air operated clutch, indicated diagrammatically at 43. Sleeve 42 carries a gear 44 which meshes with and drives a gear 45 on a parallel countershaft 46. A sprocket 47 on shaft 46 is connected by a chain 48 to the drive sprocket 49 of the rotary table 50. The rotary table and its internal drive mechanism may be conventional or of any desired construction.

Figure 5:
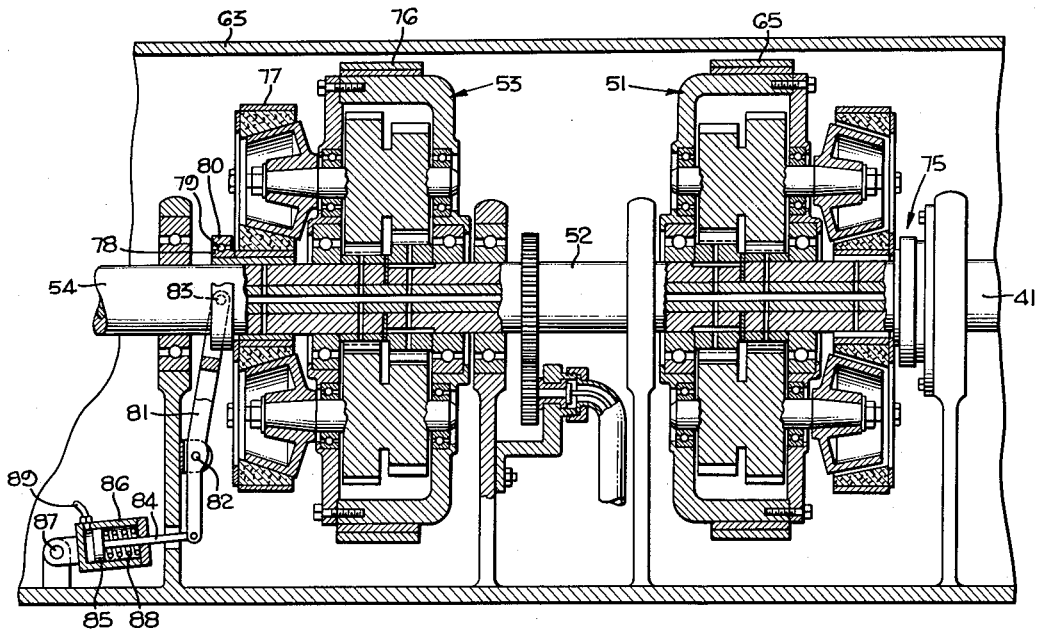
Figure 5 is a longitudinal section taken on the line 5—5 of Figure 1.

Shaft 41 also constitutes the input shaft of a two speed planetary transmission, indicated diagrammatically at 51 in Figure 1 and shown in greater detail in Figure 5. The transmission 51 is identical in construction and mode of operation to the transmission 14 previously described except that a different form of shifting mechanism is employed, as hereinafter pointed out in greater detail. The output shaft 52 of the transmission 51 constitutes the input shaft of a third two-speed transmission 53, which is likewise identical in construction and mode of operation to the transmission 14 except for its shifting mechanism. However, transmission 53 is preferably reversed in position so that it will establish either a 1 to 1 drive ratio between the shaft 52 and a shaft 54 or, when the planetary cage is stationary, will rotate shaft 54 at a higher speed than that of shaft 52.

The output shaft 54 of transmission 53 is connected by gears 55 and 56 to the previously mentioned shaft 12. Gear 55 is fixed to shaft 54 while gear 56 is normally freely rotatable with respect to shaft 12 but may be fixed thereto by operation of a pneumatic clutch, indicated diagrammatically at 57. A sprocket 58 on shaft 54 is connected by means of a chain 59 to a sprocket 60 journaled on the shaft of a hoisting drum 61. The sprocket 60 may be clutched to the hoisting drum by any suitable clutch, indicated at 62. The complete transmission mechanism, including the shafts 12, 7, 15, 41, 52 and 54 and the transmissions and gears connected thereto, is preferably enclosed in a single casing, indicated by a dotted line outline 63, and shown fragmentarily in Figures 2, 3, 4 and 5. The extremities of shafts 41 and 54, which project from the casing, are provided with catheads 63 and 64 respectively.

The transmission construction described above may be selectively operated to meet all conditions encountered in rotary well drilling operations. Thus, for hoisting the rotary drill stem, clutches 38 and 62 are engaged and clutches 43 and 57 are disengaged. If it is desired to employ both engines for hoisting purposes, clutch 13 is also engaged, otherwise it is disengaged. One or both engines then drive the hoisting drum through the three two-speed transmissions 14, 51 and 53 in series. Since, for reasons hereinafter pointed out, the speed ratios of these three transmissions are identical, a total of four different geared speed ratios is available between the torque converters and the drum.

With the mechanism of the present invention, it will not generally be necessary to drive the hoisting drum in reverse because lowering of the drill stem may be achieved by using the hydrokinetic torque converters 5 and 9 as a hydraulic braking means with their output shafts 6 and 10 rotating in reverse compared with the direction of rotation of the input shafts 4 and 8, which will be driven by the engines at a speed necessary to balance the load. For this purpose, it will be understood that suitable cooling means for the liquid in the torque converters must be provided. The preferred cooling mechanism consists of a differentially driven fan and radiator unit. However, if it is desired to positively drive the drum in reverse, clutch 38 is disengaged and clutch 57 engaged. The hoisting drum is then driven either from shaft 7 or shaft 12, or both, through gears 55 and 56 and sprockets 58 and 60 in a reverse direction.

During normal drilling operations, it is necessary to operate the slush pumps and the rotary table 50 simultaneously. This is accomplished by disengaging clutches 13, 38 and 62 and by engaging clutches 57 and 43. Engine 2 then drives the power take-off pulley 36 for the slush pump through transmission 14, while engine 3 drives the rotary table through gears 55 and 56, transmissions 53 and 51, gears 44 and 45, and sprockets 47 and 49. The two engines under these conditions operate independently of each other and provision is made for independently changing the speed ratios to the two power take-offs. Thus, by shifting transmission 14, two different speed ratios may be provided for the slush pump take-off. By shifting transmissions 51 and 53, three different speed ratios may be provided for the rotary table. In addition, in both cases the automatic torque and speed ratio characteristics of the torque converters are available.

When it is desired to reverse rotation of the table, clutches 57 and 62 are disengaged and clutches 38 and 43 are engaged. Then one or both engines may drive the rotary table at either one of two speeds through transmission 14, both speeds being in a direction reverse to the normal direction of table rotation when driven through the gears 55 and 56.

As mentioned previously, while all three of the transmissions 14, 51 and 53 are of the same type, it is preferred to mount the transmission 53 in reverse relation so that it acts as an overdrive when shaft 52 is driving shaft 54. This does not change the number of speed ratios available for operation of the various elements of the machine because there still remains three two-speed transmissions connected in series. This arrangement, however, has two advantages. First, it reduces the maximum torque on shaft 54 during hoisting operations and, therefore, reduces the size and strength of the transmission parts. Secondly, by mounting the transmission 53 in such a reverse relation, it operates as a step-down transmission during normal table driving operations. Since in that case shaft 54 is driving shaft 52, this reduces the speed reduction required between gear 44 and table operating sprocket 49 which would otherwise be relatively high. While this particular arrangement of the transmission 53 is preferred for the reasons stated, it will be apparent that transmission 53 may be mounted in exactly the same manner as transmission 51, in which event identical speed and torque requirements may be satisfied by decreasing the size of sprocket 60 relative to sprocket 58 and by increasing the torque multiplication between gear 44 and sprocket 49 correspondingly.

It will be apparent from the above that while power is always transmitted through transmission 14 in the same direction, power is transmitted through transmissions 51 and 53 in one direction during hoisting, and in the opposite direction when the rotary table is driven forwardly. As a result, regardless of how transmissions 51 and 53 are positioned, when power is transmitted in one direction through them, it will be in a direction from the low speed shaft to the high speed shaft. However, the form of transmission indicated at 14 and shown in Figure 2 cannot give two speed ratios when power is delivered through the transmission from the low speed shaft 15, because in that direction the torque reaction on the planet cage tends to rotate the cage in the same direction as the input shaft. One way clutch blocks cannot be used to prevent such rotation of the planet cage without also preventing transmission of power at the 1 to 1 ratio. Accordingly, for that reason, a different form of mechanism is provided in transmissions 51 and 53 to effect a shift in the speed ratios.

Referring to Figures 4 and 5, transmissions 51 and 53 omit the one way clutch blocks of transmission 14 and in lieu thereof employ pneumatically operated brake bands for holding the planet cages against rotation in one speed ratio. Thus transmission 51 is provided with a brake band 65, one end of which is adjustably anchored to the casing by an eye bolt 66, and the other is connected to a pin 67 which is eccentrically fixed to a shaft 67' journaled on the casing. An arm 68 fixed on shaft 67' is connected to the piston rod 69 of a pneumatic cylinder and piston unit including a piston 70 and a cylinder 71. The cylinder 71 is pivotally connected to the casing 63 by a pin 72. A spring 73 normally actuates piston 70 in a direction to apply and hold the brake band applied, as shown in Figure 4, thus maintaining the transmission 51 in its low speed ratio for hoisting. By admitting air under pressure to the cylinder through conduit 74, release of the brake is effected. At the same time, air under pressure will be admitted to the annular cylinder 75 which causes engagement of the planet gear clutches to establish a 1 to 1 speed ratio through the transmission. The annular cylinder 75 is identical in construction and mode of operation to the cylinder 31 of Figure 2 and hence is not illustrated in detail. Since, to effect shift of transmission 51 to its 1 to 1 ratio, air pressure must be admitted simultaneously to both of the cylinders 71 and 75, a single valve may be employed for that purpose.

Transmission 53 is provided with a similar brake band 76 which may be operated by mechanism identical to that employed to operate brake band 65. However, transmission 53 is reversed with respect to transmission 51 and it is preferred to hold the transmissions in their low speed ratio for hoisting purposes by action of springs rather than air pressure. That means that transmission 53 should be held in its 1 to 1 ratio by springs and shifted to its step-up speed ratio during hoisting by air pressure. The only change in the brake applying mechanism required for this purpose is to rotate the shaft 67 of Figure 4 to a position 180° from that shown when connecting it to the arm 68. Then the spring 73 will hold the brake disengaged and air pressure will apply the brake. In view of the minor character of this change, the brake band operating mechanism for transmission 53 is not separately illustrated in the drawings.

The mechanism for operating the planet gear clutches of transmission 53 is shown in Figure 5. As there shown, the clutch plate 77 has fixed thereto a collar 78 on which is journaled by a ball bearing 79 a shifting ring 80. A shift lever 81 which is pivoted at 82 has a yoke at its upper end which is pivoted to the ring 80 by aligned pins 83. The opposite end of the lever is connected to a piston rod 84 having a piston 85 in a cylinder 86. The cylinder is pivotally connected to the housing by a pin 87. A spring 88 normally holds the piston in its illustrated position in which the planet gear clutches are engaged and the transmission 53 is in its 1 to 1 ratio. When air under pressure is admitted simultaneously to cylinder 86 through conduit 89 and to the cylinder which applies brake 76, the transmission is shifted to its other speed ratio.

Except as indicated above, transmissions 51 and 53 are identical to transmission 14 and hence need not be further described.

Means are provided in accordance with the present invention for automatically synchronizing the engines 2 and 3 during hoisting operations while leaving the driller free to adjust the throttles of the engines to produce any desired performance. Synchronization of the engines is achieved by the mechanism shown principally in Figures 6 through 10 and also to some degree in Figure 1. Thus referring to Figure 1, the throttles for the two engines, which are indicated diagrammatically at 90 and 91, are operated by a pair of Bowden wires 92 and 93, respectively, which are connected respectively to the lower ends of a pair of hand operated throttle levers 94 and 95, shown best in Figure 9. Lever 95 is carried by a sleeve 96 which is freely journaled on a shaft 97 carried by a suitable supporting frame work 98. The shaft 97 is fixed against rotation. The left-hand end of sleeve 96 is provided with an arm 99 in which is mounted a suitable spring detent 100 adapted to co-operate with an arcuate toothed ratchet bar 101 fixed to the frame work 98 in order to hold the throttle lever 95 in any one of a plurality of adjusted positions.

The throttle lever 94 is similarly fixed to a sleeve 102 which is freely rotatable upon the shaft 97. The sleeve 102 likewise is provided with an arm 103 carrying a spring pressed detent 104 adapted to co-operate with an arcuate toothed ratchet member 105 fixed to the frame work 98. When the sleeve 102 is in the position illustrated in Figure 9, the lever 94 may be employed to adjust the throttle of engine 2 independently of the throttle position of engine 3 which is controlled by the lever 95. Such operation will be required when the engines are independently driving the slush pump and rotary table, respectively.

Means are provided for placing the control of the throttles of both engines under the influence of lever 95, and this means automatically maintains the two engines in synchronism in order to insure that the two engines will carry equal shares of the load during the hoisting operations. This is accomplished by making the sleeve 102 of lever 94 slidable upon the shaft 97 to cause engagement between a plurality of dog clutch teeth 106 on sleeve 102 with mating teeth 107 on a sleeve 108 which is freely rotatable upon the shaft 97. A spring pressed detent 109 is provided within the sleeve 102 for engagement with either one or a pair of V-shaped grooves 110 and 111 formed in the shaft 97 in order to maintain the sleeve 102 in either one of its two axial positions of adjustment.

When the sleeve 102 is shifted to the left to cause engagement between the clutch teeth 106 and 107, the spring pressed detent 104 is pulled out of contact with the arcuate ratchet member 105 so that the ratchet mechanism no longer effects the operations of the lever 94. In order to insure re-engagement of the detent 104 with the ratchet member 105, the edge of the arcuate ratchet member 105 is beveled at 112 and the detent 104 is provided with a shoulder 113 adapted to limit the projection of the detent from the arm 103, as best shown in Figure 10. Sleeve 96 of lever 95 is provided with a second arm 114 which is connected through a synchronizing mechanism hereinafter described to an arm 115 on the sleeve 108 in such a manner that movements of the lever 95, which are directly effective to shift the throttle 91 of engine 3, also correspondingly shift the throttle 90 of engine 2 through the mechanism which insures that both engines will also be operated at the same speed.

Thus, as best shown in Figures 6 and 9, the arm 114 on sleeve 96 is connected by a Bowden wire 116 to a lever 117 which is pivoted intermediate its ends on a pin 118. The opposite end of the lever 117 is connected by means of a Bowden wire 119 to the arm 115 on sleeve 108. As a result of this arrangement, counterclockwise swinging movement of the lever 95, as viewed from the right-hand end of the shaft 97, produces a similar movement of sleeve 108 and, therefore, of sleeve 102, which is clutched thereto, thus opening the throttles of both engines to the same degree. In order to modify the throttle movement of engine 2 to any extent necessary to maintain the engines in synchronism, the pin 118 of lever 117 is adjusted vertically by a differential mechanism which is responsive to any difference between the speeds of the shafts 4 and 8.

Thus, as best shown in Figure 8, shaft 4 which is mounted within a suitable housing 120 is provided with a multiple thread worm 121 adapted to drive a worm wheel 122 fixed to a shaft 123. Shaft 8, which is similarly positioned within the housing 124, carries a worm 125 which drives a worm wheel 126 fixed to a shaft 127. The worms 122 and 126 are of opposite hand with the result that the shafts 123 and 127 are rotated in opposite directions and at speeds directly proportional to the speeds of the shafts 4 and 8, respectively. The shafts 123 and 127 are the input shafts of a differential gearset mounted within a housing 128. Thus shaft 123 carries a bevel gear 129 adapted to mesh with a pair of bevel gears 130 and 131 journaled on a cage 132 which is freely rotatable upon the shafts 123 and 127. Shaft 127, in turn, carries a bevel gear 133 which meshes with the bevel gears 130 and 131. The cage 132 carries a bevel gear 134 which meshes with a bevel gear 135 carried by a vertical shaft 136. As best shown in Figures 6 and 7, the shaft 136 is provided with a threaded section 137 which is threaded through a sliding block 138 which carries the previously mentioned lever pin 118. Block 138 has a sliding dovetail connection 139 with a vertical support 140 which is fixed to the casing 128 of the differential. The threaded portion 137 is of larger diameter than the remainder of the shaft and terminates below the upper extremity of the shaft. A coil spring 141 surrounds the shaft between the block 138 and the casing 128, thus exerting an upward force on block 138 for a purpose hereinafter mentioned.

The arrangement of the gearing for the shafts 123 and 127 is such that when the shafts 4 and 8 are driven in the same direction at the same speed by the engines 2 and 3, bevel gears 129 and 133 will operate in opposite directions at the same speed and the cage 132 will remain stationary, consequently, there will be no movement of the sliding block 138. In the event that the speed of shaft 4 exceeds that of shaft 8, shaft 123 will rotate at a more rapid rate in clockwise direction, as viewed in Figure 6, than will the shaft 127 in the opposite direction. Consequently, the cage 132 will rotate in a counterclockwise direction, as viewed in Figure 6, and effect a clockwise rotation of the shaft 112, as viewed in Figure 7. Since the threaded portion 137 of the shaft 136 has a right-hand thread, this will cause the block 138 to move upwardly. Since during such movement the left-hand end of lever 117 does not change position, the effect of the movement is to move the right-hand end of lever 117 upwardly, thus partially closing the throttle 90 of engine 2. This closing movement will continue until the speed of the shafts 4 and 8 becomes the same, at which time rotation of the shaft 136 will stop. In the event that shaft 4 tends to rotate at a lower speed than shaft 8, the reverse effect will be produced.

The above described synchronizing mechanism performs two important functions when both engines are used for hoisting. In the first place, it insures that the two engines will share equally in supplying the power required. This follows from the fact that the two engines drive a common shaft through separate torque converters. If the two converters are the same in construction, as they should be, then they will transmit exactly the same torque because their input shafts are rotating at the same speed and their output shafts are also rotating at the same speed. In addition, the synchronizing mechanism insures that both torque converters will be operating at the same speed ratio, and hence act like a single converter of double capacity. This is important because, as hereinafter pointed out, the design of the transmissions 14, 51 and 53 and the mechanism for controlling them is correlated with the speed ratio characteristics of the converters.

Under some conditions, as during starting of the engines, a very great divergence in the speeds of the two engines may exist for a short period. Consequently, means are provided for limiting the effect of the differential mechanism upon the throttle of engine 2. This is accomplished by making the threaded section 137 of the shaft 136 relatively short and of larger diameter than the shaft. Consequently, the block may thread off either end of the threaded portion. As soon as this occurs, its axial movement will cease and it will remain in that position until a reverse rotation of the shaft 136 occurs. Since the block is guided by the dovetail 139, it will always remain in position to re-enter the threaded portion of the shaft. When it is threaded off the upper end of the threaded section 137, gravity will tend to bring it back into threaded engagement. When it is threaded off the lower end of the threaded section 137, the previously mentioned spring 141 will exert sufficient force to effect the threading engagement. If desired, a spring similar to the spring 141 may be provided for the upper end of the shaft 136.

As is well known, the torque converters 5 and 9 provide an automatic torque ratio and speed ratio adjustment which is peculiarly advantageous when utilized in the drive of a hoisting drum, particularly during the start of a hoisting operation, because it provides a high starting torque and an automatic decrease in the torque as the load is speeded up. This follows from the characteristic torque speed ratio curve illustrated in Figure 21. However, the efficiency of hydrokinetic torque converters is relatively low except within a relatively limited range of speed ratios, as shown by the characteristic efficiency curve also incorporated in Figure 21. Accordingly, while the torque converter drive is of great value for starting purposes, it is unsatisfactory for the bulk of the hoisting operation unless the speed ratio of the converter is maintained within the efficient range. Accordingly, there is incorporated in the present invention automatic means for controlling the operation of the three two-speed transmissions in such a manner as to maintain the torque converter speed ratio within the range in which the converter operates near its maximum efficiency.

While the efficiency curves for hydrokinetic torque converters of different designs vary somewhat, the particular curve illustrated in Figure 21 is generally representative. Accordingly, it will be employed for purposes of illustrating the principles of the present invention. Assuming that the converters to be employed have an efficiency curve corresponding to that illustrated in Figure 21, it will be noted that the range of speed ratios within which the efficiency equals or exceeds 80 percent extends from a speed ratio of the output shaft to the input shaft of .25 to a ratio of .50. If the torque on the input shaft increases to such an extent that the speed ratio of the converter falls below .25, the efficiency drops rapidly. Likewise, if the torque on the output shaft of the converter decreases to such an extent that the speed ratio of the converter exceeds .50, there is a rapid drop in efficiency. These two ratios may, therefore, be selected as the minimum and maximum efficient speed ratios for purpose of designing the transmission mechanism. Thus, automatic means are provided which, in response to the speed ratio of the converter, will shift the transmission mechanism into a higher gear ratio when the speed ratio of the converter tends to exceed the maximum efficient ratio (.50 in the above example) and shift the transmission into a lower speed ratio when the speed ratio of the converter tends to fall below the minimum efficient ratio (.25 in the above example). This mechanism controls each of the three transmission units 14, 51 and 53 individually and is so arranged as to provide the proper successive step by step change in speed ratio through all four of the available ratios provided by the complete transmission mechanism.

For example, since for the torque converter, whose efficiency curve is illustrated in Figure 21, the maximum efficient speed ratio is just twice the minimum efficient speed ratio, each of the three transmissions 14, 51 and 53 may be so constructed that one of its two speed ratios is twice that of the other. Consequently, for a given engine speed, if as a result of a reduction in load, the speed ratio of the converter tends to exceed .50, and one of the three transmissions is then shifted to its next higher speed ratio, the speed and torque of the hoisting drum will not be changed but the output speed of the converter will be cut in half and the output torque doubled, thus bringing the torque converter back to a speed ratio of .25, which is its minimum efficient speed ratio. Conversely, if at any time the load increases to such an extent that the speed ratio of the converter tends to fall below .25 and as a consequence one of the transmissions is shifted to a lower speed ratio, the torque and speed of the drum 61 will not change but the output speed of the converter will double and the torque be cut in half, thus bringing the converter speed ratio back to .50. In all positions of adjustment of the transmission, the speed ratio of the converter may fluctuate automatically in response to changes in load between the speed ratio of .25 and .50 without any transmission shifts. Since, with the preferred type of two speed transmission unit disclosed in the drawings, one speed ratio is always a direct drive or 1 to 1 ratio, then to accomplish the above results the other ratio should be 2 to 1.

The mechanism by which the transmission is automatically shifted is best illustrated in Figures 1 and 11 through 15. Thus, as best shown in Figure 11, the transmission control mechanism includes three differentially operated electrical switches, indicated generally at 142, 143 and 144, mounted on a common mounting plate 145. Each of the three differential switch mechanisms includes a geared differential which may be identical in construction and mode of operation to the differential illustrated in Figure 8. Thus, as best shown in Figure 12, the differential switch mechanism 142 includes a differential 146 having a pair of input shafts, one of which is connected to a flexible drive shaft 147 and the other to a bevel gear 148. The differential also has a vertically extended output shaft 149 corresponding to the shaft 136 of Figure 8. The bevel gear 148 of differential switch 142 and the corresponding bevel gears 150 and 151 of the identically constructed differential switch mechanisms 143 and 144 mesh with a common bevel gear 152 which is mounted on a vertical shaft 153 that is driven by a flexible shaft 154. The differential switch mechanism 143 has a flexible input shaft 155, while the differential switch mechanism 144 has a similar flexible shaft 156.

Flexible shaft 154 is connected to the end of shaft 123 in Figure 8 and, consequently, is driven at a speed proportional to the speed of shaft 4. Flexible shaft 147 is connected by a pair of gears 157 and 158 to the output shaft 15 of transmission 14. Flexible shaft 155 is connected by a pair of gears 159 and 160 to the output shaft 52 of transmission 51. Flexible shaft 156 is connected by a pair of gears 161 and 162 to the output shaft 54 of transmission 53. Thus, the input shafts 147, 155 and 156 of the three differential switch mechanisms are driven at speeds proportional to the speeds of the output shafts of the three transmission units. Moreover, the drive connections are such that during hoisting operations, the direction of rotation of the flexible shafts 147, 155 and 156 are opposite to the directions of rotation of the bevel gears 148, 150 and 151. Consequently, for any given differential switch mechanism, the speed of the third or output shaft will be zero when the speeds of the two input shafts are equal. Moreover, the gearing in the drive connections of the input shafts of the three differentials is such that when any one of the transmission units and all preceding transmission units are in their low speed ratios and the speed ratio of the converters approaches the maximum efficient ratio, the two input shafts of the differential associated with said one transmission unit will rotate in opposite directions at approximately the same speed; and the same result will occur when any one of the transmission units and all preceding transmission units are in their high speed ratios and the speed ratio of the converters approaches the minimum efficient ratio. Thus, when the one transmission and all preceding transmissions are in low gear, the output shaft of the differential associated with said one transmission unit will rotate in one direction when the speed ratio of the converters is less than the maximum efficient ratio and in the opposite direction when the speed ratio exceeds that ratio. Likewise, when said transmission unit and all preceding units are in their high gear ratios, the output shaft of the differential associated with that transmission unit will rotate in said one direction when the speed ratio of the converters is less than the minimum efficient ratio, and in said opposite direction when the speed ratio exceeds the minimum efficient speed ratio. Accordingly, means are provided which operate in response to a reversal of the direction of rotation of the output shaft of each differential mechanism for shifting the associated transmission to its low speed ratio when the output shaft of the differential tends to rotate in said one direction, and to its high speed ratio when the differential output tends to rotate in said opposite direction.

By so effecting the shift at or near the speed at which the output shaft of each differential mechanism is zero, it is possible to insure that the shift of the transmission will always occur at the desired converter speed ratio regardless of variations in the speed of the input shaft of the torque converter. This result cannot be obtained if the transmission shifting mechanism is constructed to operate in response to a predetermined speed of the differential output shaft unless that speed is relatively close to zero as compared to the speeds of the differential input shafts.

While any suitable mechanism responsive to the reversal of the direction of the rotation of the output shafts may be employed to effect a shift of the transmissions, the preferred mechanism illustrated in the drawings is in the form of an electrical switch, which is driven by a slipping clutch mechanism from the output shaft of the differential, and which controls the electrical circuit for a pneumatic valve that, in turn, effects the necessary shift of the transmission. Thus, as best shown in Figures 12, 13 and 14, the output shaft 149 of the differential 146 carries a multipole permanent magnet 163 which is freely rotatable within a housing 164 formed of an electrically conductive material and fixed to an independently journaled shaft 165. The multi-pole permanent magnet 163 and its housing 164 form an eddy current magnetic clutch of a well known type, and may be of any desired or conventional construction. As is well known, rotation of the multipole permanent magnet within the housing tends to induce eddy currents within the housing 164 which are cut by the moving lines of force emanating from the permanent magnets. Consequently, the member 163 transmits a driving torque to the member 164 but may slip relative thereto to an unlimited extent. Fixed in any suitable manner to the housing 164 is a cylindrical pin 166 formed of insulating material. The pin 166 projects through a slot 167 formed in a switch mounting plate 168, which constitutes the top of an enclosed housing 169 for the eddy current clutch. The upper extremity of the pin 166 is provided with a transverse slot 170 as best shown in Figure 14, and in that slot is tightly fitted an electrically conductive contact bar 171 which is adapted to complete a circuit between a pair of stationary contacts 172 carried by the switch mounting plate 168 when the pin 166 is at the lower end of the slot 167, as viewed in Figure 13. A coil spring 173 extends from a bracket 174 to the pin 166 and acts to yieldingly retain the pin 166 at either extremity of the slot 167 by reason of the fact that the spring 173 has an over-center action. The bracket 174 is connected by means of a stove bolt 175 to the switch mounting plate 168; and the position of the bracket may be adjusted along the slot 176 in the mounting plate 168 and also by reason of the slot 177 in the bracket 174 so that it assumes any desired position. Thus, if desired, the position of the bracket may be so shifted that the sole tendency of the spring is to urge the pin in one direction in slot 167.

The arrangement of the gearing to the differential input shafts is such that when the transmission unit with which the differential is associated and all preceding transmission units, if any, are in low gear and the speed ratio of the converter reaches approximately its maximum efficient ratio, or when the transmission units are in their high ratio and the speed ratio approaches approximately its minimum efficient ratio, shaft 149 will remain stationary. If those speed ratios are exceeded in either case, shaft 149 will rotate in a direction to cause pin 166 to move downwardly in slot 167, as viewed in Figure 11. If the speed ratio falls below those ratios in either case, shaft 149 will rotate in the opposite direction and tend to move pin 166 upwardly in slot 167. If the spring 173 is designed to have an overcenter effect tending to hold the pin 166 at either end of the slot 167, the spring should be exceedingly light so that a relatively slow rotation of the shaft 149 in either direction will overcome the force of the spring and shift the pin 166.

As soon as the pin reaches the position illustrated in Figure 13, the electric circuit between contacts 172 is completed and the transmission is shifted from its low speed ratio to its high ratio for hoisting. Immediately after the shift, the speed ratio of the converter will drop back from its maximum efficient ratio to its minimum efficient ratio, but because the engine speed and the output speed of the transmission are not reduced by such shift, the pin 166 will remain in the position illustrated in Figure 13 until the speed ratio of the converter falls below its minimum efficient ratio. In such event, the direction of rotation of the shaft 149 reverses and the pin is swung upwardly in slot 167, as viewed in Figure 13, thus breaking the circuit between contacts 172 and effecting a shift of the transmission back into its low speed ratio. It should be noted that the differential switch mechanism 142 controls the shifting of transmission 14, differential switch 143 controls transmission 51 and the differential switch 144 controls transmission 53.

The valves which control operation of the three transmissions and the electrical control circuit therefor are shown diagrammatically in Figure 15. Thus, the three transmissions are indicated diagrammatically in Figure 1 by their reference numerals 14, 51 and 53. Transmissions 14 and 51 are so constructed that they are normally in their low speed ratio of 2 to 1, but will shift to their high speed ratio of 1 to 1 when air under pressure is admitted through the air inlet lines 34 for transmission 14 and line 178 for transmission 51. Line 178 is in communication with the interior of cylinder 75 which applies the planet clutches of transmission 51 and also communicates through the branch line 74 with the cylinder 71 which controls the brake band of transmission 51, as previously described.

Transmission 14 is controlled by a three way valve 179 which is supplied with air under pressure from a line 180 through a branch line 181 and which normally connects line 34 to the exhaust port 182 and blocks line 181. The valve employed is of the solenoid operated type being controlled by a solenoid 183. When the solenoid 183 is energized, the exhaust port 182 is blocked and line 181 is connected to line 34, thus causing a shift of the transmission 14 to its high gear ratio of 1 to 1. A similar valve 184 controls the shifting of transmission 51 and is operated by solenoid 185. Since in the preferred form of the invention transmission 53 is reversed with respect to the other two transmissions, its high gear ratio is a 1 to 2 ratio. However, since this transmission is normally in its 1 to 1 ratio and shifts to 2 to 1 when air pressure is applied, the control valve 186 for transmission 53 is identical to the valves 179 and 184. Thus valve 186 normally blocks the line 187 and connects line 188 to the exhaust port 189. When the solenoid 190 is energized, the valve connects lines 187 and 188 and blocks the exhaust port. Line 188 communicates with line 89 which supplies air to the planet clutch operating cylinder 86 of transmission 53 and also with line 191 which supplies air to the cylinder, indicated diagrammatically at 192 in Figure 15, which applies brake band 76 of transmission 53. Solenoid controlled three way valves, either pilot or directly operated, are standard articles of commerce and any desired type may be employed for control of the three transmissions so long as they function in the manner indicated above. Consequently, the details of construction form no part of the present invention and need not be further described.

As shown in Figure 15, the solenoids 183, 185 and 190, which operate the transmission shifting valves 179, 184 and 186, respectively, are connected in parallel between a pair of electric power lines 193 and 194 by lines 195, 196 and 197. The three lines 195, 196 and 197 contain normally open contacts of relays 198, 199 and 200, respectively, which relays, in turn, are connected in series, respectively, with the stationary contacts of the differential switches 142, 143 and 144 by means of parallel lines 201, 202 and 203. As a result, closing of any one of the differential switches will energize the associated relay solenoid and shift its transmission unit to the high ratio, and vice versa. If desired, the relays 198, 199 and 200 may be of the delayed closing type and be adjusted to close within a very brief interval following closure of the differential switch contacts. This will prevent shifting of the transmissions on a momentary load fluctuation. The contacts are preferably of the quick opening type so that no delay in shifts to lower gear ratios will occur.

In order to obtain the desired operating characteristics for the hoisting drum, it is necessary to correlate the design of the transmission mechanism with the efficiency and torque curves of the converter. The curves so employed should preferably be the curve of converter output torque for a fixed throttle setting of the particular engine which is used plotted against converter speed ratio, and the converter efficiency plotted against converter speed ratio for the same fixed engine throttle position. The curves of Figure 21 are generally representative although different engines and different converters will have slightly different characteristics and, therefore, the actual curves for the engine and converter combination which is to be used should be employed.

To obtain the necessary correlation in design, it is necessary to select first the speed ratios of the converter at which it is desired to shift the transmission. These are referred to as the maximum efficient speed ratio and the minimum efficient speed ratio. These ratios should be on opposite sides of the speed ratio of maximum efficiency and in a range where the efficiency is fairly high. Preferably the ratios should be at points on the efficiency curve where the efficiencies are approximately the same. The first transmission unit 14 is then so designed that for a given engine speed, when the transmission unit is in its low gear ratio and the converter is operating at its maximum efficient ratio, a shift of the transmission to its high gear ratio will occur without any decrease in the ratio of the speed of the output shaft of the transmission to the input speed of the converter, and preferably with as little increase in that ratio as possible. Likewise, when the transmission is in high gear and the converter is operating at its minimum efficient speed ratio, a shift of the transmission to its low gear ratio occurs without any increase in the ratio of the speed of the output shaft of the transmission to the input speed of the converter, and preferably with as little decrease in that ratio as possible. It will be apparent to those skilled in the art that suitable transmission ratios may be readily selected to satisfy these conditions for any given maximum and minimum efficient speed ratios. In the ideal case, however, the maximum and minimum efficient speed ratios are those at which the converter efficiency is the same and the ratio between the two speed ratios of the transmission unit equals the ratio between the maximum and minimum efficient speed ratios.

Having determined the transmission ratios and the maximum and minimum efficient speed ratios for transmission 14, it is only necessary to provide the proper speed ratios in the drives to the differential switch 142 to effect a shift of the transmission at the correct converter speed ratios. In the ideal case, assuming that the switch would operate at exactly the point of reversal of the output shaft 149, the gearing in the drives for shafts 154 and 147 should be such that when the converter is at its maximum efficient speed ratio and the transmission is in low gear, the shafts 154 and 147 will rotate at the same speed in opposite directions. The same condition will then exist in the ideal case when the converter is at its minimum efficient speed ratio and the transmission is in its high gear.

If, as in the embodiment of the invention illustrated in the drawings, the complete transmission includes a plurality of two speed transmissions connected in series, the same considerations govern the design of each transmission unit. The fact that the transmission 14 precedes transmissions 51 and 53 does not complicate the problem because transmission 51 never shifts in either direction except when transmission 14 is in its high gear ratio and transmission 53 does not shift in either direction except when transmissions 14 and 51 are both in their high gear ratios.

In order to obtain a maximum utilization of the efficient range of the torque converter, all three transmissions should have the same ratio between their two speeds and shift at the same speed ratios of the converter. If they are so constructed and all of the transmissions are in their low gear ratio, then the mechanism will be effective to shift the transmission units into their high gear ratios successively as the hoisting load falls off in such a manner as to maintain the speed ratio of the converter within its efficient range. However, if two or more of the transmission units are in their high speed ratios and the load increases sufficiently to reduce the converter speed ratio to the minimum efficient ratio, all of the transmission units which are in their high ratio will shift to their low ratio simultaneously. If such a shift is more than necessary, one or more transmission units will then shift back to their high ratios, as required. If it is desired to avoid the double shifting thus induced on shifts to high ratios, the mechanism previously described may be adjusted or modified slightly in any one or several ways to produce successive shifts of the transmission units to their high ratios.

For example, the springs 173 of the differential switches may be so adjusted that on an increase in hoisting load, when all three transmission units are in their high ratios, switch 144 will open before switch 143 and switch 143 will open before switch 142. This can be done by providing progressively stronger springs for the switches 142, 143 and 144 or by adjusting the spring brackets 174 along slot 176 so that when the switches are closed, the spring for switch 144 has a greater over-center effect than that of switch 143, etc. A second method of achieving this result is to distribute the shifting points of the three transmissions at slightly spaced intervals along the efficiency curve. This amounts to a selection of slightly different maximum and minimum efficient speed ratios for the three transmissions. This can be done either by slightly modifying the speed ratios in the drives to the differential switches, even though the speed ratios of the transmissions are all the same, or by providing slightly different speed ratios in the three transmissions. However, if either of these last two expedients are employed, care should be taken to insure that for none of the transmission units is the ratio of the transmission output shaft speed to the converter input speed less at minimum efficient speed ratio in low gear than at maximum efficient speed ratio in high gear.

The following illustrative example is given to further elucidate the principles outlined above: If the converter efficiency curve is assumed to be that of Figure 21 and it is desired to keep the converter within the speed ratio range at which its efficiency is 80% or more, then the minimum efficient speed ratio may be taken as .25 and the maximum efficient speed ratio may be taken as .50. Since the ratio between these two converter speed ratios is 2 to 1, then the ratio between the two speed ratios of the transmission may also be made 2 to 1. Since, with the preferred form of transmission unit disclosed above, one speed ratio is necessarily a 1 to 1 ratio, then the other may be a 2 to 1 ratio. Transmissions 14 and 51, therefore, each give a 2 to 1 speed reduction for hoisting when in low gear. Transmission 53, being similar but reversed, has a 1 to 1 ratio in low gear and a 1 to 2 overdrive in high gear for hoisting. All three transmissions are normally in their low gear ratios giving a total geared ratio of 4 to 1.

If it is assumed that the speed ratio between the output of the converter and the input of transmission 14 is 1 to 1, and that the speed ratio between the engine shaft 4 (or 8) and bevel gear 148 of Figure 11 is 2 to 1, then the speed ratio between the shaft 15 and shaft 147 of Figure 11 should be 1 to 2. If all three transmissions were to shift at the same maximum efficient speed ratio, then the speed ratio between shaft 52 and shaft 155 of Figure 11 should be 1 to 2, and the speed ratio between shaft 54 and shaft 156 should be 1 to 1. However, in order to insure successive shifts into low speed ratio, the last two ratios are made 1 to 1.97 and 1 to .97.

A mechanism having the above specified ratios will operate automatically to give the speed and torque characteristics shown on the following table, assuming a constant engine speed of 1600 R. P. M., a constant engine torque of 1500 foot pounds (2 engines), and a speed ratio of 5 to 1 between shaft 54 and the hoisting drum. With an engine speed of 1600 R. P. M., the bevel gears 148, 150 and 151 of the differential switches will operate at 800 R. P. M. and, therefore, the output shafts of the differentials will be stationary when the other differential input shafts (147, 155 and 156) rotate at 800 R. P. M. The speeds of these other differential input shafts are shown in the column headed "Diff. Input."

As the load continues to fall off, the differential input for transmission 51 reaches the shifting speed of 800 R. P. M. when the converter is at its maximum efficient speed ratio and the transmission is in second gear. After shifting, the speed of the differential input for transmission 51 remains unchanged at 800 R. P. M. but the converter drops back to its minimum efficient speed ratio. In this case, the minimum efficient speed ratio is .254 rather than .25 due to the fact that the speed multiplication between the output shaft to transmission 51 and the input shaft 155 to the differential has been modified in the manner described above for the purpose of insuring successive shifts of the transmissions into their low gear ratios on increases in the hoisting load. Note that at the time transmission 51 is shifted, the differential input for transmission 53 is less than shifting speed. Moreover, after transmission 51 has shifted to its high gear ratio of 1 to 1 and the load further decreases, the speed of the differential input shaft for transmission 51 never falls below 800 R. P. M., consequently, the transmission remains in its high speed ratio.

When on further reuction of load in third gear the converter reaches its maximum efficient speed ratio, the differential input to transmission 53 attains its shifting speed of 800 R. P. M. and the complete transmission mechanism shifts to its high gear ratio without any change in the speed of the differential input for transmission 53 until further reductions in the hoisting load occur.

It will be noted from the above that the maximum and minimum efficient speed ratios for each of the three transmissions are different as a result of the modification of the speed ratios between the transmission output shafts and the differential input shafts for each transmission. This modification is made in order to prevent simultaneous shifting of all three transmissions to their low gear ratio when all transmissions are in their high gear

| Hoisting Conditions | | Speed Ratio of Converter | Transmission 14—R. P. M. | | | Transmission 51—R. P. M. | | Transmission 53—R. P. M. | | Drum Speed | Drum Torque, Ft. Lbs. |
|---|---|---|---|---|---|---|---|---|---|---|---|
| | | | Input | Output | Diff. Input | Output | Diff. Input | Output | Diff. Input | | |
| Low Gear | Stall | 0 | 0 | 0 | 0 | 0 | 0 | 0 | 0 | 0 | 150,000 |
| | Min. Eff. Speed R | .25 | 400 | 200 | 400 | 100 | 197 | 100 | 97 | 20 | 90,000 |
| | Max. Eff. Speed R | .50 | 800 | 400 | 800 | 200 | 394 | 200 | 194 | 40 | 45,000 |
| 2nd Gear | Min. Eff. Speed R | .25 | 400 | 400 | 800 | 200 | 394 | 200 | 194 | 40 | 45,000 |
| | Max. Eff. Speed R | .507 | 812 | 812 | 1,624 | 406 | 800 | 406 | 394 | 81.2 | 22,500 |
| 3rd Gear | Min. Eff. Speed R | .254 | 406 | 406 | 812 | 406 | 800 | 406 | 394 | 81.2 | 22,500 |
| | Max. Eff. Speed R | .515 | 824 | 824 | 1,648 | 824 | 1,624 | 824 | 800 | 165 | 11,250 |
| High Gear | Min. Eff. Speed R | .257 | 412 | 412 | 824 | 412 | 812 | 824 | 800 | 165 | 11,250 |
| | Max. Eff. Speed R | .50 | 800 | 800 | 1,600 | 800 | 1,580 | 1,600 | 1,550 | 320 | 5,625 |

It will be observed that the above table shows the successive speed conditions as the torque load on the hoisting drum falls off from maximum stall torque with all three of the transmission units initially in their low gear ratios. The transmissions 14, 51 and 53 shift successively to their high speed ratios when the differential input shafts 147, 155 and 156, respectively, reach a speed of 800 R. P. M. Thus, it will be noted that the differential input for the switch 142 of transmission 14 does not reach a speed of 800 R. P. M. until the torque converter is at its maximum efficient speed ratio. After the shift of transmission 14 has been effected, the speed of the differential input remains at 800 R. P. M. so long as the torque load on the drum remains the same and the converter operates at its minimum efficient speed ratio in second gear. On subsequent reductions in load, the differential input for transmission 14 always remains at a speed in excess of 800 R. P. M., consequently, the transmission is maintained in its high speed ratio of 1 to 1. Note that at the time the differential input for transmission 14 reaches the shifting speed of 800 R. P. M., the differential inputs for transmissions 51 and 53 are well below the shifting speed, consequently, only one transmission will be shifted.

ratio and the load increases. Thus, as shown on the table, when the converter is at its minimum efficient speed ratio in high gear, the only differential input shaft which is rotating at 800 R. P. M. is the shaft for the differential of transmission 53, consequently, only that transmission will shift to low gear as the load increases. The same thing is true when the converter is at its minimum efficient speed ratio in third gear at which time only the differential input for transmission 51 is operating at 800 R. P. M.

The speeds given in the above table are based upon the assumption that the engines are operating at a speed of 1600 R. P. M. at all times. In actual practice, it is preferred to fix the engine throttles at a desired point and allow their speeds to vary in accordance with variations in the torque load imposed upon them, since that practice improves the character of the efficiency curve of the converter. This will result in a slight reduction in the speeds given in the table for the minimum efficient speed ratio. In addition, it may be desirable to adjust the throttle position from time to time for purposes of controlling the speed of the hoisting drum.

Any changes in engine speed which result from either of these factors will not change the speed ratios at which the several transmission units are shifted so long as the differential switch mechanism is effective to open or close the control switch contacts at exactly the point of reversal of the differential output shaft, because the differential drives to each differential switch will change in speed to the same proportion. For that reason, the differential switch mechanisms are preferably made as sensitive as is practically possible.

With the particular form of differential switch illustrated, sensitivity may be increased to any desired extent by increasing the strength of the magnetic clutch, increasing the speed ratio between the differential housing and the differential output shaft, increasing equally the speed ratios to the differential input shafts, and decreasing the strength of the over-center spring connected to the movable contact of the switch. By any one or more of these expedients, the difference between the speeds of the input shafts of the differential, which will be required to effect a shift of the movable contact may be reduced to such a small percentage of the speeds of the differential input shafts that changes in the converter input speed will have a negligible effect upon the speed ratios at which the respective transmissions shift.

It should also be noted that at any appreciable difference in speeds of the input shafts of the differential switches required to effect a shift of the switch contact will, in effect, shift the converter speed ratio at which the transmission shifts to a value different from that which exists when the differential input shafts are rotating at the same speed. Accordingly, allowance for that factor should be made in designing the transmission mechanism.

It will be observed that there is provided in accordance with the present invention a fully automatic transmission mechanism effective to maintain the speed ratio of a hydrokinetic torque converter which is employed in the mechanism within a predetermined speed ratio range, and which will provide a wide range of torques and speeds automatically as required by the load imposed on the mechanism. The broad principles of the mechanism may be realized by the use of any form of change speed gearing provided it is controlled in the manner described above, and any desired number of geared speed changes may be utilized depending upon the total range of load which must be dealt with. In the particular example set forth above employing three two-speed transmissions connected in series, an automatic range of drum speeds is provided between zero and 320 R. P. M. with a corresponding drum torque range from 150,000 ft. lbs. to 5,625 ft. lbs. neglecting friction and mechanical losses other than those encountered in the hydrokinetic torque converter.

The automatic control mechanism for shifting the transmission at the desired converter speed ratio is operated independently of the engine speed and, consequently, the engine throttles may be adjusted as desired to meet any requirements encountered. Thus, for example, the engine throttles may be adjusted to such a position that the mechanism merely holds the load in a stationary position or controls the rate of its descent. Likewise at the end of a lowering operation, by slightly opening the engine throttles, the mechanism will operate as a brake, thus eliminating the need for hydrokinetic brake mechanisms frequently employed in deep well drilling operations.

As previously indicated, the preferred form of mechanism illustrated in the drawings is not only adapted for automatic hoisting operations of the type required during rotary well drilling operations but is also effective to operate the slush pump and rotary table during drilling operations. The change over of the transmission from hoisting to drilling is readily effected by means of a control lever 204, shown in Figure 16, and the associated mechanisms, shown in Figures 15 through 20. Thus, as shown diagrammatically in Figure 15, the line 195 which contains the solenoid 183 of the control valve 179 of transmission 14 is provided with a normally open switch 205. The line 196 which contains the solenoid 185 of control valve 184 contains a normally open switch 206, and line 197 for solenoid 190 of valve 186 contains a normally open switch 207. As best shown in Figure 16, the three switches 205, 206 and 207 are of the push button type having movable plungers controlled by a cam 208 fixed to the shaft 209 which carries the control handle 204. The form and arrangement of the cam 208 is such that it depresses the plungers of switches 205, 206 and 207, thus holding the switches in closed position when the control handle is in the solid line position illustrated in Figure 17. The handle is shifted to that position in order to place the transmission under the influence of its automatic control mechanism.

If it is desired to disconnect the automatic control mechanism from the transmission and place it under the influence of manual control, lever 204 is pulled into the solid line position 210. This disengages the cam 208 from the plungers of switches 205, 206 and 207 thereby opening the solenoid control lines 195, 196 and 197. However, the three solenoid control lines are provided with three branch control circuits 211, 212 and 213 which contain normally open switches 214, 215 and 216 respectively. As is best shown in Figure 16, the switches 215 and 216, which are also of the plunger type, are adapted to be operated by a pair of cams 217 and 218, respectively, which are likewise fixed to the shaft 209. Switch 214 is adapted to be operated by a cam 219 carried by a sleeve 220 which is freely rotatable upon the shaft 209 and carries a second operating lever 221.

As is best shown in Figures 17 through 20, when the main control handle 204 is shifted to the dotted line position of 210 in Figure 17, the automatic control mechanism for the transmissions is disconnected at switches 205, 206 and 207 but branch lines 211, 212 and 213 remain open at their switches 214, 215 and 216. This provides a low gear ratio for hoisting purposes, because all of the transmission control valve solenoids are de-energized. Likewise during drilling operations, when the handle 204 is in the dotted line position of 210, the rotary table drive is at its high speed ratio. Movement of the handle 204 to the position indicated by dotted line 222 in Figure 17 causes cam 218 to close switch 215 thereby actuating the control valve 184 and shifting transmission 51 to its high speed ratio for hoisting purposes. Since switches 214 and 216 remain open, this position provides the second gear for hoisting purposes and an intermediate or second gear for driving the rotary table. Movement of the control handle 204 to the dotted line position 223 causes cam 218 to close switch 216, while cam 218 retains switch 215 in its closed position. This places transmissions 51 and 53 in their high gear ratios for hoisting purposes, thus providing the third gear for hoisting and a low gear for driving the rotary table.

As previously indicated, the cam 219 which controls switch 214 is not fixed to the shaft 209 but is carried by the sleeve 220. However, a ring 224 fixed to shaft 209 alongside of the cam 219 is provided with a dog 225, which on clockwise movement of the control handle 204 from the solid line position of Figure 17 to the dotted line position 210, is moved into contact with an abutment face 226 on the cam 219 without moving the cam. Thereafter, as the handle 204 is progressively moved in a counterclockwise direction, as viewed in Figure 17, cam 219 will move in the same direction as cams 217 and 218. When the handle 204 reaches the dotted line position 223 previously mentioned thus closing switches 215 and 216, switch 214 will still remain open. However, if the handle 204 is shifted into the dotted line position 227, the cam 219 will close switch 214 and place the entire transmission mechanism in its high gear ratio for hoisting purposes.

The lost motion connection between shaft 209 and cam 219 is provided in order to permit adjustment of the speed ratio of transmission 14 independently of the speed ratios of transmissions 51 and 53 so that the gear ratio to the slush pump may be controlled independently during drilling operations. Accordingly, during drilling, the gear ratio to the rotary table may be shifted to any one of the three available speed ratios by shifting the handle 204 to any one of the positions 210, 222 or 223 and with the control handle 204 in any one of such three positions, handle 221 may be shifted to close or open switch 214 as desired and thus control the speed ratio of transmission 14. The handle 221 may also be used to control the speed ratio of transmission 14 during reverse table rotation.

An important advantage of the particular form of transmission illustrated at 14 and described above is that the one way brake blocks automatically prevent reverse rotation of the planet gear housing on shifts of the transmission from one gear ratio to the other during hoisting. Consequently, it is not necessary to carefully time the engagement of the means for preventing such reverse rotation with the disengagement of the planet gear clutches as is required when brake bands and the like are employed to hold the planet housing against rotation, as shown in connection with transmissions 51 and 53. This is an important consideration in hoisting operations since it eliminates the danger of momentarily dropping the load between the transmission shifts. However, transmissions 51 and 53 cannot be constructed in the same manner as transmission 14 for the reason that at different times during the drilling operations, power is transmitted through them in different directions. Consequently, the mechanism for holding the planet cages against rotation must prevent rotation in one direction under one condition and in the opposite direction under another condition. It is for that reason that brake bands are employed in the transmissions 51 and 53.

In order to avoid the disadvantages of the brake band construction, there is shown in Figure 24 an alternative form of transmission unit which may be employed in lieu of that disclosed at 51. As shown partly in diagrammatic manner in Figure 24, the transmission unit indicated generally at 228 is identical to the transmission 51 except for the mechanism employed to hold the planet cage 229 against rotation when the transmission is in its 2 to 1 ratio. In place of the brake band employed in transmission 51, transmission 228 is provided with three equally spaced pairs of one way brake blocks, one pair of which is shown in Figure 24. As there shown, each pair of brake blocks includes a brake block 230 and the brake block 231 both mounted within a suitable recess formed in the casing 232. The brake blocks 230 and 231 are so arranged that one will prevent rotation of the planet gear housing 229 in one direction and the other in the other direction, and means are provided for rendering one or the other of the brake blocks inoperative to produce the desired operating conditions.

This mechanism, which is mounted upon the closure plate 233 for the recess in the housing 232, comprises a double ended cylinder 234 containing a pair of pistons 235 and 236 connected by a rod 237. A spring 238 normally holds the two pistons at the right-hand end of their stroke, as viewed in Figure 24, and air pressure may be admitted through line 239 to the right-hand end of the cylinder to shift both pistons to the left-hand end of their stroke. A dog 240 fixed to the piston rod 237 passes through a slot formed in the plate 233 and operates to shift one or the other of blocks 230 and 231 outwardly in the recess in such a manner as to prevent the block from wedging between the planet gear housing and the plate 233, as it must be prevent rotation of the housing.

The arrangement of the parts is such that the spring 238 normally holds the brake blocks 231 in an inoperative condition. Consequently, the planet cage may also rotate freely in counterclockwise direction, as viewed in Figure 24, but reverse or clockwise rotation is prevented by brake blocks 230. Accordingly, when the power is delivered to transmission 228 through shaft 41 of Figure 1 for hoisting purposes, the transmission 228 will operate in exactly the same manner as transmission 14, shifting from its high gear ratio of 1 to 1 to its low gear ratio of 2 to 1 when the planet gear clutches are disengaged, and vice versa.

As previously indicated, the planet gear clutches are engaged by energizing the solenoid 185 of control valve 184 and thus admitting air to the annular cylinder 75 of Figure 5. As shown diagrammatically in Figure 24, such admission of air under pressure to annular cylinder 75 will not normally admit air under pressure to cylinder 234 because of the provision of a valve 241 which normally blocks the flow of air under pressure to the line 239 and connects line 239 to the exhaust port 242. Valve 241 is a solenoid operated valve and its solenoid 243 may be energized by closing the manually operated switch 244. Switch 244 is closed manually when it is desired to drive the rotary table in a forward direction. Such closure opens valve 241 and at the same time blocks its exhaust port 242. Accordingly, when solenoid 185 is energized to open valve 184, air under pressure will flow not only to the annular cylinder 75 but through valve 241 to the cylinder 234, thereby shifting the pistons 235 and 236 to a position in which the dog 240 renders the one way brake block 230 inoperative and permits the block 231 to return to its operative position. Consequently, the planet cage 229 is free to rotate in the clockwise direction, as viewed in Figure 24, as is required when it is in its 1 to 1 ratio and power is being delivered through it from shaft 52 to shaft 41 of Figure 1. When it is desired to place transmission 228 in its 2 to 1 ratio during forward table driving movement, solenoid 185 is de-energized, thus connecting cylinders 234 and 75 to the exhaust port of valve 184, and permitting block 231 to hold the planet cage 229 against counter-clockwise rotation, as viewed in Figure 24.

A further advantage of the type of mechanism shown in Figure 24 over the brake band mechanism of transmission 51 is that by spacing the three pairs of brake blocks equally about the circumference of the planet cage, the cage may be held against rotation without imposing any radial loads upon the main bearings of the transmission.

The construction shown in Figure 24 may also be employed in lieu of transmission 53, previously described, provided the transmission is so installed that it provides a step-down speed ratio for hoisting purposes as distinguished from the previously mentioned preferred reverse arrangement of transmission 53.

As previously indicated, the differential switch control mechanism for the transmission of the present invention is effective to maintain the torque load on the hydrokinetic torque converter automatically within such a range that the converter operates within a predetermined range of speed ratios independent of the speed of the converter input shaft. In some cases, as where a governed engine is employed, or where for other reasons the range of engine speeds is small, the same or comparable results may be achieved without the use of the differential switch mechanisms by controlling the transmission shifting mechanism in accordance with the speeds of the output shafts of each transmission unit. An alternative construction of this type is illustrated more or less diagrammatically in Figures 22 and 23.

As shown in Figure 22, the complete power transmission system includes an engine 245, a hydrokinetic torque converter 246, and a two speed transmission 247 which may be similar in construction to the transmission 14 previously described. The output shaft 248 of the transmission 247 has fixed thereto a sleeve 249 to which is pivoted any desired number of equally spaced flyball governor arms 250, each of the arms being pivoted to the sleeve 249 by means of a pin 251. Each of the flyball governor arms is provided with a roller 252 adapted to bear against the face of a ring 253 which is slidably mounted on the shaft 248. The ring 253 is normally urged to the right of shaft 248 against the rollers 252 by means of a spring 254, which surrounds the shaft 248 and which may be adjusted by means of a pair of lock nuts 255 and 256 threaded on the shaft. An annular ring 257 surrounds a boss formed on the ring 253 and is journaled for rotation on the ring 253 by means of a pair of combined radial and axial thrust ball bearings, indicated at 258. Fixed to the ring 257 in any suitable manner is a post 259 which is formed of insulating material and projects through a suitable slot 260 formed on a stationary bracket 261. An electrically conductive contact bar 262 is fixed to the post 259 and adapted to close an electrical circuit between a pair of stationary contacts 263, which correspond to the contacts 172 of Figure 15.

It will be apparent that the above described mechanism will be effective to close a circuit through contacts 263, and thus effect a shift of the associated transmission 247 to its high gear ratio when the speed of the shaft 248 reaches a value at which centrifugal force acting on the flyball arms 250 overcomes the force exerted by the spring 254, and vice versa. It will also be apparent that any desired number of transmission units may be connected in series, each having a flyball governor operated switch mechanism of the type shown in Figures 22 and 23 mounted on its output shaft. Thus, with three two-speed transmissions connected in series, this type of shifting control mechanism will produce exactly the same speed and torque characteristics shown on the foregoing table provided the engine speed remains constant, and provided the springs 254 for each transmission control switch are so adjusted that the contacts close at the respective transmission output shaft speeds indicated in the table.

It will be apparent there is provided in accordance with the present invention an exceedingly compact rotary well drilling machine employing a hydrokinetic torque converter and an automatic transmission effective during hoisting operations to maintain the torque converter within its range of maximum efficiency. As a result, for hoisting purposes, extremely flexible control of the hoisting speed at high efficiency may be achieved by simply manipulating the throttle lever for the engines. This, combined with the high starting torque provided by the hydrokinetic torque converter, greatly reduces the time required for the successive hoisting operations employed in removing the drill stem section by section from the hole in order to change the drill bit. In addition, the mechanism is so constructed and arranged that by simple manipulation of suitable clutch control levers, not shown, the same transmission units employed in hoisting may be employed for independently driving the rotary table and the slush pumps for drilling operations.

While only two engines are employed in the form of invention illustrated, it will be apparent that for larger units additional engines may be connected to the shafts 7 and 12, if desired. It is understood that in such case, the output shafts of the additional engines may either be directly connected to the input shafts of the torque converters employed in connection with the engines 2 and 3, or may be connected to the transmission through independent torque converters. In the latter case, it is preferred to employ a differential throttle control synchronizing mechanism of the type shown in Figures 6, 7 and 8 for each additional engine in order to insure that the input speeds of all converters are the same speed during hoisting.

If desired, the slush pump power take-off can be omitted, in which event transmission unit 14 may either be omitted or it may be positioned in alignment with units 51 and 53, with a resulting reduction in the over-all width of the machine. Any desired type of change speed transmission may connect shafts 41 and 54 or any number of the preferred form of two speed transmission units may be employed. In addition, when the slush pump power take-off is omitted only one engine need be employed for light drilling operations.

While the invention is illustrated and described in connection with a rotary well drilling machine, it will be apparent that many of the principles of the invention may be employed to advantage in other forms of hoisting apparatus or in any case where a wide range of torques and speeds is required. In addition, the provision of a transmission mechanism employing a plurality of stages connected in series through one or more of which power may be delivered in either direction to different power take-offs, may also be used to advantage in any case where a single source of power is required to operate a plurality of different units either singly or in combination at different times. Likewise the engine synchronizing mechanism by which the power delivered by the engines is equalized may be employed in any case where a plurality of engines are utilized to drive through individual hydrokinetic torque transmitting devices, or their equivalent, a single shaft or a plurality of shafts whose speeds are mechanically maintained at the same value.

While several modifications of the mechanism are illustrated and described, it will be apparent that others are available within the spirit of the invention and within the scope of the appended claims.

I claim:

1. A power transmission mechanism including a hydrokinetic torque converter having input and output shafts, a two-speed transmission connected to the converter output shaft, and means including a positive differential drive between the input side of said torque converter and the output side of said transmission for automatically shifting said transmission from one speed ratio to another in such a manner as to maintain the ratio of the speed of the converter input shaft to the speed of the converter output shaft between predetermined speed ratios to the extent possible with the speed ratios available in the transmission, said differential drive including a reversible differential output member operable to effect said shifting of said transmission upon a reversal of said differential output member.

2. A power transmission mechanism including a hydrokinetic torque converter having input and output shafts, a two-speed transmission connected to the converter output shaft, and means including a positive differential drive between the input side of said torque converter and the output side of said transmission for automatically shifting said transmission from one speed ratio to another in such a manner as to maintain the ratio of the speed of the converter input shaft to that of the converter output shaft between predetermined speed ratios independently of variations in the speed of the converter input shaft to the extent possible with the speed ratios available in the transmission, said differential drive including a reversible differential output member operable to effect said shifting of said transmission upon a reversal of said differential output member.

3. A power transmission mechanism including a hydrokinetic torque converter having input and output shafts, a two speed ratio transmission connected to the converter output shaft, and means including a positively driven differentially operated mechanism responsive to the ratio of the speed of the converter input shaft to that of the transmission output shaft for automatically shifting said transmission from one predetermined speed ratio to another in such a manner as to maintain the ratio of the speed of the converter input shaft to that of the converter output shaft between predetermined limits independently of variations in the speed of the converter input shaft, said differential mechanism including a reversible differential output member operable to effect said shifting of said transmission upon a reversal of said differential output member.

4. A power transmission mechanism including a hydrokinetic torque converter having input and output shafts, a two speed transmission connected to the output shaft of said converter, means including a positive differential drive between the input side of said torque converter and the output side of said transmission for automatically shifting said transmission from its lower to its higher ratio when said ratio of the speed of the converter output shaft to that of the converter input shaft reaches a predetermined speed ratio above that at which the converter operates at maximum efficiency and for shifting said transmission back to its lower ratio when said ratio of the converter shafts is less than a second predetermined speed ratio below that at which the converter operates at maximum efficiency, said differential drive including a reversible differential output member operable to effect said shifting of said transmission upon a reversal of said differential output member.

5. A power transmission mechanism including a hydrokinetic torque converter having input and output shafts, a two speed transmission connected to the output shaft of said converter, means including a positive differential drive between the input side of said torque converter and the output side of said transmission for automatically shifting said transmission from its lower to its higher ratio when the ratio of the speed of the converter output shaft to that of the converter input shaft reaches a predetermined speed ratio above that at which the converter operates at maximum efficiency and for shifting said transmission back to its lower ratio when said ratio of the converter shafts is less than a second predetermined speed ratio below that at which the converter operates at maximum efficiency, said transmission ratios bearing approximately the same relation to each other as said predetermined speed ratios bear to each other, and said predetermined speed ratios being two ratios on opposite sides of the peak of the converter efficiency curve at which the converter efficiency is approximately the same, said differential drive including a reversible differential output member operable to effect said shifting of said transmission upon a reversal of said differential output member.

6. A power transmission mechanism including a hydrokinetic torque converter having input and output shafts, a two speed transmission connected to the output shaft of said converter, means including a positive differential drive between the input side of said torque converter and the output side of said transmission responsive to a predetermined ratio of the speed of the transmission output shaft to that of the converter input shaft and substantially independent of the converter input shaft speed for automatically shifting said transmission from its lower to its higher ratio when the ratio of the speed of the converter output shaft to that of the converter input shaft reaches a predetermined speed ratio above that at which the converter operates at maximum efficiency and for shifting said transmission back to its lower ratio when said ratio of the converter shafts is less than a second predetermined speed ratio below that at which the converter operates at maximum efficiency, said transmission ratios bearing approximately the same relation to each other as said predetermined speed ratios bear to each other, and said predetermined speed ratios being two ratios on opposite sides of the peak of the converter efficiency curve at which the converter efficiency is approximately the same, said differential drive including a reversible differential output member operable to effect said shifting of said transmission upon a reversal of said differential output member.

7. A power transmission mechanism including a hydrokinetic torque converter having input and output shafts, a two speed transmission connected to the output shaft of said converter, means including a positive differential drive between the input side of said torque converter and the output side of said transmission for automatically shifting said transmission from its lower to its higher ratio when the ratio of the speed of the converter output shaft to that of the converter input shaft reaches a predetermined speed ratio above that at which the converter operates at maximum efficiency and for shifting said transmission back to its lower ratio when said ratio of the converter shafts is less than a second predetermined speed ratio below that at which the converter operates at maximum efficiency, the higher of said transmission ratios being approximately twice the lower ratio and the higher of said predetermined speed ratios being approximately twice that of the lower speed ratio, and said predetermined speed ratios being two ratios on opposite sides of the peak of the converter efficiency curve at which the converter efficiency is approximately the same, said differential drive including a reversible differential output member operable to effect said shifting of said transmission upon a reversal of said differential output member.

8. A power transmission mechanism including a hydrokinetic torque converter having input and output shafts, a two speed transmission connected to the output shaft of said converter, means including a positive differential drive between the input side of said torque converter and the output side of said transmission responsive to a predetermined ratio of the speed of the transmission output shaft to that of the converter input shaft and substantially independent of the input shaft speed for automatically shifting said transmission from its lower to its higher ratio when the ratio of the speed of the converter output shaft to that of the converter input shaft reaches a predetermined speed ratio above that at which the converter operates at maximum efficiency and for shifting said transmission back to its lower ratio when said ratio of the converter shafts is less than a second predetermined speed ratio below that at which the converter operates at maximum efficiency, the higher of said transmission ratios being approximately twice the lower ratio and the higher of said predetermined speed ratios being approximately twice that of the lower speed ratio, and said predetermined speed ratios being two ratios on opposite sides of the peak of the converter efficiency curve at which the converter efficiency is approximately the same.

9. An automatic two speed transmission for use in conjunction with a hydrokinetic torque converter including a two speed transmission having an input shaft adapted for connection to the output shaft on the torque converter, means operable to shift said transmission from either of its speed ratios to the other, a positively driven differential mechanism having input members adapted for operative connection to the output side of the transmission and the input side of the torque converter respectively, said differential mechanism having a reversible output member and an operative connection between the output of said differential mechanism and said means effective in response to a reversal of said differential output member to actuate said means to shift said transmission to its higher ratio when the transmission is in its lower ratio and the ratio of the speed of the transmission output to that of the converter input reaches a predetermined speed ratio and actuate said means to shift said transmission to its lower ratio when the transmission is in its high ratio and the ratio of said speeds is below said predetermined speed ratio.

10. A power transmission mechanism including a hydrokinetic torque converter, a two speed transmission having an input shaft connected to the output shaft of the torque converter, means operable to shift said transmission from either of its speed ratios to the other, a positively driven differential mechanism having input members connected to the output side of the transmission and the input side of the torque converter respectively, said differential mechanism having a reversible output member and an operative connection between the output of said differential mechanism and said means effective in response to a reversal of said differential output member to actuate said means to shift said transmission to its higher ratio when the transmission is in its lower ratio and the ratio of the speed of the transmission output to that of the converter input reaches a predetermined speed ratio and actuate said means to shift said transmission to its lower ratio when the transmission is in its higher ratio and the ratio of said speeds is below said predetermined speed ratio.

11. An automatic two speed transmission for use in conjunction with a hydrokinetic torque converter including a two speed transmission having an input shaft adapted for connection to the output shaft of the torque converter, means operable to shift said transmission from either of its speed ratios to the other, a positively driven differential mechanism having input members adapted for operative connection to the output shaft of the transmission and the input shaft of the torque converter repectively, and an operative connection between the output of said differential mechanism and said means effective to actuate said means to shift said transmission to its higher ratio when the transmission is in its lower ratio and the ratio of the speed of the transmission output to that of the converter input reaches a predetermined speed ratio and actuate said means to shift said transmission to its lower ratio when the transmission is in its high ratio and the ratio of said speeds is below said predetermined speed ratio, said differential mechanism being so constructed that its output is zero when the speed ratio is approximately at said predetermined ratio, and said operative connection between the differential output and said means being effective to actuate said means on reversals of said differential output.

12. A power transmission mechanism including a hydrokinetic torque converter, a two speed transmission having an input shaft connected to the output shaft of the torque converter, means operable to shift said transmission from either of its speed ratios to the other, a positively driven differential mechanism having input members connected to the output side of the transmission and the input side of the torque converter respectively, and an operative connection between the output of said differential mechanism and said means effective to actuate said means to shift said transmission to its higher ratio when the tratnsmission is in its lower ratio and the ratio of the speed of the transmission output to that of the converter input reaches a predetermined speed ratio and actuate said means to shift said transmission to its lower ratio when the transmission is in its higher ratio and the ratio of said speeds is below said predetermined speed ratio, said differential mechanism being so constructed that its output is zero when the speed ratio is approximately at said predetermined speed ratio, and said operative connection between the differential output and said means being effective to actuate said means on reversals of said differential output.

13. An automatic two speed transmission for use in conjunction with a hydrokinetic torque converter including a two speed transmission having an input shaft adapted for connection to the output shaft of the torque converter, means operable to shift said transmission from either of its speed ratios to the other, a positively driven differential mechanism having input members adapted for operative connection to the output side of the transmission and the input side of the torque converter respectively, and an operative connection between the output of said differential mechanism and said means effective to actuate said means to shift said transmission to its higher ratio when the transmission is in its lower ratio and the ratio of the speed of the transmission output to that of the converter input reaches a predetermined value and actuate said means to shift said transmission to its lower ratio when the transmission is in its high ratio and the ratio of said speeds is below said predetermined value, said differential being of the geared mechanical type and being so constructed and driven that the output thereof reverses its direction of rotation at approximately said predetermined ratio, and said operative connection between the differential output and said means including a slipping clutch.

14. A power transmission mechanism including a hydrokinetic torque converter, a two speed transmission having an input shaft connected to the output shaft of the torque converter, means operable to shift said transmission from either of its speed ratios to the other, a positively driven differential mechanism having input members connected to the output side of the transmission and the input side of the torque converter respectively, and an operative connection between the output of said differential mechanism and said means effective to actuate said means to shift said transmission to its higher ratio when the transmission is in its lower ratio and the ratio of the speed of the transmission output to that of the converter input reaches a predetermined value and actuate said means to shift said transmission to its lower ratio when the transmission is in its higher ratio and the ratio of said speeds is below said predetermined value, said differential being of the geared mechanical type and being so constructed and driven that the output thereof reverses its direction of rotation at approximately said predetermined ratio, and said operative connection between the differential output and said means including a slipping clutch.

15. An automatic multiple speed ratio transmission for operative connection with output side of a hydrokinetic torque converter including a transmission mechanism capable of providing at least three speed ratios, each successive speed ratio above the lowest being approximately the same multiple of the next lower speed ratio, and automatic means for shifting said transmission to the speed ratio necessary to maintain the speed ratio of the converter between predetermined limits, said automatic means including a positive differential drive between the input side of said torque converter and the output side of said transmission.

16. An automatic multiple speed ratio transmission for operative connection with output side of a hydrokinetic torque converter including a transmission mechanism capable of providing at least three speed ratios, each successive speed ratio above the lowest being approximately the same multiple of the next lower speed ratio, and automatic means for shifting said transmission to the speed ratio necessary to maintain the speed ratio of the converter between predetermined limits independently of variations in the input speed of the converter, said automatic means including a positive differential drive between the input side of said torque converter and the output side of said transmission.

17. An automatic multiple speed transmission for use in conjunction with a hydrokinetic torque converter including a plurality of two speed transmission mechanisms connected in series and adapted to be connected to the output shaft of the converter, independent means for shifting each of said transmission mechanisms from either of its speed ratios to the other, a separate positively driven differential mechanism for each transmission mechanism, each differential mechanism having one input element adapted for connection to the input side of said converter, means connecting the other input element of each differential to the output side of the transmission mechanism with which the differential is associated, and means operatively connecting the output of each differential with the shifting means for the associated transmission mechanism and effective to actuate said shifting means in the sequence and manner necessary to maintain the speed ratio of the converter between predetermined limits.

18. An automatic multiple speed transmission for use in conjunction with a hydrokinetic torque converter including a plurality of two speed transmission mechanisms connected in series and adapted to be connected to the output shaft of the converter, independent means for shifting each of said transmission mechanisms from either of its speed ratios to the other, a separate positively driven differential mechanism for each transmission mechanism, each differential mechanism having one input element adapted for connection to the input side of said converter, means connecting the other input element of each differential to the output side of the transmission mechanism with which the differential is associated, and means operatively connecting the output of each differential with the shifting means for the associated transmission mechanism and effective to actuate said shifting means in the sequence and manner necessary to maintain the speed ratio of the converter between predetermined limits, each of said differential mechanisms being so constructed that the output thereof has a null point in the delivery characteristic thereof when the associated transmission mechanism is in its lower gear ratio and the torque converter is operating at approximately its maximum desired speed ratio, and each said shift actuating means being effective to actuate the shifting means of the associated transmission mechanism when the associated differential output is near its null delivery point.

19. An automatic power transmitting mechanism including a hydrokinetic torque converter having input and output shafts, a plurality of two speed transmissions connected in series to the output shaft of the converter, independent means for shifting each of said transmissions from either of its speed ratios to the other, a separate positively driven differential mechanism associated with each transmission, each differential mechanism having one input element connected to the input side of the converter and the other input element connected to the output side of the transmission with which it is associated, and means operatively connecting the output of each differential with the shifting means for the associated transmission and effective to actuate said shifting means in the sequence and manner necessary to maintain the speed ratio of the converter between predetermined limits.

20. An automatic power transmitting mechanism including a hydrokinetic torque converter having input and output shafts, a plurality of two speed transmissions connected in series to the output shaft of the converter, independent means for shifting each of said transmissions from either of its speed ratios to the other, a separate positively driven differential mechanism associated with each transmission, each differential mechanism having one input element connected to the input side of the converter and the other input element connected to the output side of the transmission with which it is associated, and means operatively connecting the output of each differential with the shifting means for the associated transmission and effective to actuate said shifting means in the sequence and manner necessary to maintain the speed ratio of the converter between predetermined limits, each of said differential mechanisms being so constructed that the output thereof has a null point in the delivery characteristic thereof when the associated transmission mechanism is in its lower gear ratio and the torque converter is operating at approximately its maximum desired speed ratio, and each said shift actuating means being effective to actuate the shifting means of the associated transmission mechanism when the associated differential output is near its null delivery point.

21. In an oil well draw works including a draw works drum, a hydrokinetic torque converter having a driving element adapted for connection to a source of power and having a driven element, means including an automatic change-speed transmission having input and output members connecting the driven element to the draw works drum, said automatic transmission incorporating means to shift from a low speed ratio to a higher speed ratio when the forward speed of the output member of the automatic transmission reaches a predetermined value and said automatic transmission including reverse speed drive means, and means operable to retain said automatic transmission in low speed ratio on reverse rotation of the output member at all reverse speeds.

22. A power transmission mechanism including a hydrokinetic torque converter, a two speed transmission having an input shaft connected to the output shaft of the torque converter, means operable to shift said transmission from either of its speed ratios to the other, a positively driven differential mechanism having input members connected to and driven by the output side of the transmission and the input side of the torque converter respectively and having a reversible, rotatably mounted output member, said differential mechanism being so constructed and driven that its output member reverses its direction of rotation when the ratio of the speed of said converter input shaft to the speed of said transmission output shaft is at a predetermined value, and control means operatively connected to the output member of the differential for shifting said transmission from its lower ratio to its higher ratio when the differential output member is rotated in the direction caused by an increase in the ratio of said speeds to a value above said predetermined value and to shift said transmission from its higher ratio to its lower ratio when the output member of said differential rotates in the opposite direction.

23. A power transmission mechanism including a hydrokinetic torque converter, a two speed transmission having an input shaft connected to the output shaft of the torque converter, means operable to shift said transmission from either of its speed ratios to the other, a differential mechanism having input members connected to and driven by the output side of the transmission and the input side of the torque converter respectively and having a rotatably mounted output member, said differential being of the geared mechanical type and being so constructed and driven that the output member thereof reverses its direction of rotation when the ratio of the speed of said converter input shaft to the speed of said transmission output shaft is at a predetermined value, a rotatably mounted device, a drive connection including a slipping clutch connecting the differential output member and said device, stops for limiting rotation of said device in both directions, and means operated by said device for shifting said transmission from its lower ratio to its higher ratio when the device moves toward one stop due to an increase in said ratio of speeds to a value above said predetermined value and to shift said transmission from its higher ratio to its lower ratio when said device moves toward the other stop.

24. An automatic power transmitting mechanism including a hydrokinetic torque converter having input and output shafts, a plurality of two speed transmissions connected in series to the output shaft of the converter, independent means for shifting each of said transmissions from either of its speed ratios to the other, a separate differential mechanism associated with each transmission, each differential mechanism having a pair of input elements and an output element, driving means connecting one input element of each differential mechanism to the input side of the converter, driving means connecting the other input element of each differential mechanism to the output side of the transmission with which it is associated, each of said differential mechanisms being so constructed and driven that the output element thereof is stationary when the associated transmission mechanism is in its lower gear ratio and the torque converter is operating at approximately its maximum desired speed ratio, and separate means operatively connected to the output element of each differential mechanism for actuating the shifting means of the associated transmission mechanism when the associated differential output element moves in one direction.

25. A power transmission mechanism, including a hydrokinetic torque converter and a change-speed geared transmission connected in series with the geared transmission on the output side of the torque converter, a positively driven differential mechanism having a pair of input shafts and a reversible rotatable output member differentially driven thereby, a driving connection between one of said differential input shafts and said power transmission mechanism at the input side of the torque converter, a driving connection between the other differential input shaft and the power transmission mechanism at the output side of the torque converter, said differential mechanism and driving connections being such that the output member reverses its direction of rotation when the speed ratio of the torque converter is at a predetermined value, and means operatively connected to said differential output member for changing said geared transmission from one speed ratio to another when the direction of rotation of said output member reverses.

26. A power transmission mechanism, including a hydrokinetic torque converter and a change-speed geared transmission connected in series with the geared transmission on the output side of the torque converter, a differential mechanism having a pair of input shafts and a rotatable output member differentially driven thereby, a driving connection between one of said differential input shafts and said power transmission mechanism at the input side of the torque converter, a driving connection between the other differential input shaft and the power transmission mechanism at the output side of the torque converter, said differential mechanism and driving connections being such that the output member is stationary when the speed ratio of the torque converter is at a predetermined value, a rotatably mounted element, a driving connection including a slipping clutch connecting said element and said differential output member, stops for limiting rotation of said element in both directions, and means operatively connected to said element for changing said geared transmission from one speed ratio to another when said element rotates from one of said stops to the other.

27. A power transmitting mechanism, comprising a hydrokinetic torque converter having its driving element adapted for connection to a power source, a change-speed transmission unit having an input shaft connected to the driven element of the torque converter and an output shaft, said transmission being adapted to provide either one of two different ratios of the speed of the output shaft of the transmission to the speed of the input shaft, the ratio between the two speed ratios of the transmission being approximately equal to the ratio between two different speed ratios of converter output shaft to the converter input shaft which are above and below the converter speed ratio of maximum efficiency and at which the efficiency of the converter is the same, and automatic means for shifting said transmission to its higher ratio when the converter speed ratio reaches or exceeds the higher of said two converter ratios and for shifting said transmission to its lower ratio when the converter speed ratio reaches or falls below the lower of said two converter ratios, said shifting means including a positive differential drive between the input side of said torque converter and the output side of said transmission unit.

28. A cable-winding drum drive for operation by an internal-combustion engine, comprising a cable-winding drum, a hydrokinetic torque converter having its driving shaft adapted for connection to the engine, an epicyclic gear transmission unit having a pair of gear elements operatively connected by planet gears journaled on a rotary cage element, an input shaft fixed to one of said elements and adapted to be connected to the converter, an output shaft connected to a second of said elements and operatively connected to said drum, friction means for selectively connecting said first and second elements together to establish a one-to-one speed ratio drive through the unit or holding the third element stationary to effect a different speed-ratio drive through the unit, the ratio between the two speed ratios of the transmission being approximately equal to the ratio between two different speed ratios of converter output shaft to the converter input shaft which are located at opposite sides of the converter speed ratio of maximum efficiency and at which the efficiency of the converter is substantially the same, and automatic means for shifting said transmission to its higher ratio when the converter speed ratio reaches or exceeds the higher of said two converter ratios and for shifting said transmission to its lower ratio when the converter speed ratio reaches or falls below the lower of said two converter ratios.

29. A cable-winding drum drive for operation by an internal-combustion engine, comprising a cable-winding drum, a hydrokinetic torque converter having its driving shaft adapted for connection to the engine, an epicyclic gear transmission unit having a pair of gear elements operatively connected by planet gears journaled on a rotary cage element, an input shaft fixed to one of said elements and adapted to be connected to the converter, an output shaft connected to a second of said elements and operatively connected to said drum, friction means for selectively connecting said first and second elements together to establish a one-to-one speed ratio drive through the unit or holding the third element stationary to effect a different speed-ratio drive through the unit, one of said transmission speed ratios being approximately twice the other, and automatic means for shifting said transmission from its low speed ratio to its high speed ratio when the speed ratio of the converter output to the converter input exceeds a predetermined high value and from its high ratio to its low ratio when the speed ratio of the converter output to the converter input falls below a predetermined lower value, said predetermined converter speed ratios being the speed ratios at which the efficiency of the converter is approximately the same and the higher ratio being approximately twice the lower ratio.

30. A cable-winding drum drive for operation by an internal-combustion engine, comprising a cable-winding drum, a hydrokinetic torque converter having its driving shaft adapted for connection to the engine, a two-speed gear transmission having a constantly operative drive of one speed ratio incorporating a one-way driving connection and a drive of a second speed ratio incorporating a disengageable friction clutch whereby engagement of the clutch effects the second speed ratio drive and disengagement renders effective the first speed ratio drive connection, said gear transmission having its input shaft connected to the output shaft of said torque converter and its output shaft operatively connected to said drum, the ratio between the two speed ratios of the gear transmission being approximately equal to the ratio between the two different speed ratios of the converter output shaft to the converter input shaft which are located at opposite sides of the converter speed ratio of maximum efficiency and at which the efficiency of the converter is approximately the same, and automatic means for operating said friction clutch to shift said gear transmission to its higher ratio when the converter speed ratio reaches or exceeds the higher of said two converter ratios and for shifting said transmission to its lower ratio when the converter speed ratio reaches or falls below the lower of said two converter ratios.

31. A power transmitting mechanism for operation by a substantially constant speed power source comprising a hydrokinetic torque converter having its driving element adapted for connection to the power source, a change-speed transmission having its input shaft connected to the driven element of the torque converter and being adapted to provide either one of two different ratios of the speed of the output shaft of the transmission to the speed of the input shaft, and a positive differential drive between the output side of the transmission and the input side of said torque converter for shifting said transmission into its higher speed ratio when the output speed of the transmission exceeds a predetermined value, and restoring the lower speed ratio when the output speed of the transmission falls below said predetermined value, the speed ratios of said transmission bearing substantially the same relation to each other as two speed ratios of the converter at which the converter efficiency is the same, one of said converter speed ratios being below and the other above the converter speed ratio of maximum efficiency, and said predetermined output speed of the transmission being that speed at which the output shaft is driven when the converter is operating at the higher of said two converter ratios and the transmission is operating at the lower of said two transmission ratios.

32. A power transmitting mechanism, comprising a hydrokinetic torque converter having its input shaft adapted to be connected to a source of power, and a multiple speed ratio transmission having its input shaft connected to the converter output shaft and having an output shaft, said transmission including automatic means operable by a positive differential drive between the input side of said torque converter and the output side of said transmission to provide any one of at least three different speed ratios each of which above the lowest ratio is approximately the same multiple of the next lower speed ratio, and the relation between each successive pair of speed ratios being approximately the same as the relation between two speed ratios of the converter at which the converter efficiency is the same, one of said converter speed ratios being below and the other above the converter speed ratio of maximum efficiency.

33. A power transmitting mechanism, comprising a hydrokinetic torque converter having its input shaft adapted to be connected to a source of power, a multiple speed ratio transmission having its input shaft connected to the converter output shaft and having an output shaft, said transmission including means selectively operable to provide any one of at least three different speed ratios each of which above the lowest ratio is approximately the same multiple of the next lower speed ratio, the relation between each successive pair of speed ratios being approximately the same as the relation between two speed ratios of the converter at which the converter efficiency is the same, one of said converter speed ratios being below and the other above the converter speed ratio of maximum efficiency, and automatic means operable by a positive differential drive between the input side of said torque converter and the output side of said transmission to shift said transmission from a lower speed ratio to the next higher speed ratio when the converter exceeds the higher of said speed ratios and to shift the transmission from a higher ratio to the next lower speed ratio when the converter falls below the lower of said speed ratios.

34. A power transmitting mechanism, comprising a hydrokinetic torque converter having its input shaft adapted to be connected to a source of power, a multiple speed ratio transmission having its input shaft connected to the converter output shaft and having an output shaft, said transmission including means selectively operable to provide any one of at least three different speed ratios between the input and output of the transmission each of which above the lowest ratio is approximately twice that of the next lower ratio, and automatic means operable by drive connections from said torque converter input shaft and said transmission output shaft to shift said transmission from a lower speed ratio to the next higher speed ratio when the speed ratio of the converter output to the converter input exceeds the maximum efficient speed ratio of the converter and from a higher ratio to the next lower speed ratio when the speed ratio of the converter falls below its minimum efficient speed ratio, said maximum and minimum converter speed ratios being the speed ratios at which the efficiency of the converter is approximately the same and the higher ratio being approximately twice the lower ratio.

35. A power transmitting mechanism for operation by a substantially constant speed power source, comprising a hydrokinetic torque converter having its driving element adapted for connection to the power source, a change-speed transmission having an input shaft connected to the driven element of the torque converter and an output shaft, said transmission being adapted to provide either one of two different ratios of the speed of the output shaft of the transmission to the speed of the input shaft, and automatic means responsive to the difference between the speed of the output shaft of the transmission and the speed of the input shaft of the torque converter to shift said transmission into its higher speed ratio when the output speed of the transmission exceeds a predetermined value, and to restore the lower speed ratio when the output speed of the transmission falls below said predetermined value, the speed ratios of said transmission bearing substantially the same relation to each other as two speed ratios of the converter at which the converter efficiency is the same, one of said converter speed ratios being below and the other above the converter speed ratio of maximum efficiency, and said predetermined output speed of the transmission being that speed at which the output shaft is driven when the converter is operating at the higher of said two converter ratios and the transmission is operating at the lower of said two transmission ratios.

36. A power transmission mechanism including a hydrokinetic torque converter, an operative connection between the output member of said converter and the input member of a change-speed geared transmission and mechanism for shifting said change-speed transmission which is operable responsive to changes in the speed ratio between the torque converter input member and an output member of said change-speed transmission, said mechanism including a positive differential drive between the input side of said converter and the output side of said transmission, the gear ratios of said change-speed transmission and the torque and speed ratios of said converter being so correlated that the rate of torque change at the output of said change-speed transmission is substantially the same immediately before and after a shift of said change-speed transmission.

37. A power transmission mechanism including a hydrokinetic torque converter, an operative connection between the output member of said converter and the input member of a change-speed geared transmission and a positively driven differential mechanism for shifting said change-speed transmission having an input member operatively connected to the input side of said torque converter and another input member operatively connected to an output member of said change-speed transmission, the gear ratios of said change-speed transmission and the torque and speed ratios of said converter being so correlated that the rate of torque change at the output of said change-speed transmission is substantially the same immediately before and after a shift of said change-speed transmission, said differential mechanism including a reversible differential output member operable to effect said shifting of said transmission upon a reversal of said differential output member.

38. A power transmission mechanism including a hydrokinetic torque converter, an operative connection between the output member of said converter and the input member of a change-speed geared transmission and a positively driven differential mechanism for shifting said change-speed transmission having an input member operatively engaged through a geared connection to the input side of said torque converter and another input member operatively engaged through a geared connection to an output member of said change-speed transmission, the gear ratios of said geared connections being such that the direction of rotation of the output member of said differential mechanism is the same immediately after a shift of said change-speed transmission as it was immediately before said shift, said differential mechanism including a reversible differential output member operable to effect said shifting of said transmission upon a reversal of said differential output member.

39. A power transmission mechanism including a hydrokinetic torque converter, an operative connection between the output member of said converter and the input member of a change-speed geared transmission and mechanism for automatically shifting said change-speed transmission operatively connected to the input side of said torque converter and to an output member of said change-speed transmission, said shifting mechanism including a positive differential drive between the input side of said converter and the output side of said transmission and being operable to shift said transmission from a lower to a higher speed ratio when the speed ratio of said converter increases beyond a predetermined ratio above that of maximum efficiency and vice versa when the converter ratio falls below said predetermined ratio.

References Cited in the file of this patent

UNITED STATES PATENTS

| | | |
|---|---|---|
| 1,165,369 | De Leeuw | Dec. 21, 1915 |
| 2,054,908 | Moore | Sept. 22, 1936 |
| 2,302,714 | Pollard | Nov. 24, 1942 |
| 2,373,453 | Brunken | Apr. 10, 1945 |
| 2,499,128 | Brunken | Feb. 28, 1950 |
| 2,529,129 | Blair | Nov. 7, 1950 |
| 2,558,193 | O'Leary | June 26, 1951 |

FOREIGN PATENTS

| | | |
|---|---|---|
| 446,979 | Great Britain | May 6, 1936 |